(12) United States Patent
Li et al.

(10) Patent No.: US 10,382,435 B2
(45) Date of Patent: Aug. 13, 2019

(54) METHOD FOR ALLOCATING ADDRESSING IDENTIFIER, ACCESS POINT, STATION, AND COMMUNICATIONS SYSTEM

(71) Applicant: Huawei Device Co., Ltd., Dongguan (CN)

(72) Inventors: Xiaoxian Li, Shenzhen (CN); Ping Fang, Shenzhen (CN); Zhiming Ding, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 105 days.

(21) Appl. No.: 15/274,751

(22) Filed: Sep. 23, 2016

(65) Prior Publication Data

US 2017/0012977 A1 Jan. 12, 2017

Related U.S. Application Data

(63) Continuation of application No. PCT/CN2015/075002, filed on Mar. 25, 2015.

(30) Foreign Application Priority Data

Mar. 25, 2014 (CN) .......................... 2014 1 0114893

(51) Int. Cl.
*H04L 29/06* (2006.01)
*H04L 29/12* (2006.01)
(Continued)

(52) U.S. Cl.
CPC ........ *H04L 63/0876* (2013.01); *H04L 9/3242* (2013.01); *H04L 61/2038* (2013.01);
(Continued)

(58) Field of Classification Search
CPC ............... H04L 63/0876; H04L 9/3242; H04L 61/2038; H04L 61/6022
(Continued)

(56) References Cited

U.S. PATENT DOCUMENTS 7,330,456 B2    2/2008  Yeh
8,126,145 B1 *  2/2012  Tewari .................. H04L 9/0841
                                                        370/401
(Continued)

FOREIGN PATENT DOCUMENTS

CN      1489339 A      4/2004
CN    102027767 A      4/2011
(Continued)

OTHER PUBLICATIONS

Alotaibi, "Rogue Access Point Detection: Taxonomy, Challenges, and Future Directions", Jun. 2016, Springer, pp. 1261-1290 (Year: 2016).*

(Continued)

*Primary Examiner* — Kenneth W Chang
*Assistant Examiner* — Gregory A Lane

(57) ABSTRACT

A method for allocating an addressing identifier includes: notifying, by an access point, at least two stations of an encrypted new MAC address that corresponds to each station, and indicating a predetermined update condition, so that the at least two stations update respective MAC addresses to the respective new MAC addresses when the predetermined update condition is met; and when the predetermined update condition is met, updating, by the access point, the MAC addresses of the at least two stations to the new MAC addresses that correspond to the stations, so that when a message is subsequently received from the stations or sent to the stations, the new MAC addresses are used as the MAC addresses of the stations. In the foregoing manner, the present invention can prevent an eavesdropper from tracing, by using a MAC address, a terminal to acquire user privacy, ensuring security of the user privacy.

15 Claims, 11 Drawing Sheets

(51) Int. Cl.
*H04W 8/26* (2009.01)
*H04W 12/02* (2009.01)
*H04L 9/32* (2006.01)
*H04W 12/04* (2009.01)
*H04W 12/06* (2009.01)
*H04W 84/12* (2009.01)

(52) U.S. Cl.
CPC ...... *H04L 61/6022* (2013.01); *H04L 63/0414* (2013.01); *H04L 63/06* (2013.01); *H04W 8/26* (2013.01); *H04W 12/02* (2013.01); *H04W 12/04* (2013.01); *H04W 12/06* (2013.01); *H04W 84/12* (2013.01)

(58) Field of Classification Search
USPC .......................................................... 713/168
See application file for complete search history.

(56) References Cited

U.S. PATENT DOCUMENTS

| | | | | |
|---|---|---|---|---|
| 2003/0081583 A1* | 5/2003 | Kowalski | .......... | H04W 72/0406 370/338 |
| 2003/0177267 A1* | 9/2003 | Orava | ............... | H04L 29/12254 709/245 |
| 2004/0006642 A1 | 1/2004 | Jang et al. | | |
| 2006/0262762 A1* | 11/2006 | Cho | ...................... | H04W 48/08 370/338 |
| 2008/0209071 A1 | 8/2008 | Kubota | | |
| 2010/0296441 A1* | 11/2010 | Barkan | ................. | H04W 12/08 370/328 |
| 2013/0195001 A1* | 8/2013 | Liu | ......................... | H04L 69/04 370/312 |
| 2015/0373758 A1* | 12/2015 | Kim | ...................... | H04W 8/26 370/329 |
| 2016/0316362 A1 | 10/2016 | Ding | | |

FOREIGN PATENT DOCUMENTS

| | | |
|---|---|---|
| CN | 104754560 A | 7/2015 |
| EP | 1379029 A1 | 1/2004 |
| EP | 3082354 A1 | 10/2016 |
| KR | 1020140003326 A | 1/2014 |

OTHER PUBLICATIONS

Dan Harkins, "Privacy Enhanced Wireless", IEEE P802.11, Wireless LANs, Mar. 16, 2013, 3 pages.

* cited by examiner

| ... | Subtype = Action frame Action frame | Receiver address RA=MAC1-0 | Action category Action category = Change identifier Change ID | CID message mode = Request request | Encrypted MAC1-1 and AID1-1 | Change time T | ... | FCS |

FIG. 5

| ... | Subtype = Action frame Action frame | Transmitter address TA=MAC1-0 | Action category Action category = Change identifier Change ID | CID message mode = Accept response | Receive MAC1-1 and AID1-1 | ... | FCS |

FIG. 6

| ... | Subtype = Action frame Action frame | Receiver address RA=MAC1-0 | Action category Action category = Change identifier Change ID | CID message mode = Request request | Encrypted MAC1-1 and AID1-1 | ... | FCS |

FIG. 7

| ... | Subtype = Action frame Action frame | Receiver address RA = Broadcast address Broadcast Address | Action category Action category = Change identifier Change ID | CID message mode = Indicator bit Indication | ... | FCS |

FIG. 8

| ... | Subtype =
Reassociation request
Reassociation Request | Transmitter
address
TA = MAC1-0 | Information element
identifier IE
ID = Change identifier
Change ID | CID message
mode = Request
request | Encrypted
MAC1-1 | ... | FCS |
|---|---|---|---|---|---|---|---|

FIG. 11

| ... | Subtype =
Reassociation response
Reassociation Response | Receiver
address
RA = MAC1-0 | Information element
identifier IE
ID = Change identifier
Change ID | CID message
mode = Response
response | Confirmation
indication, and
encrypted
AID1-1 | ... | FCS |
|---|---|---|---|---|---|---|---|

FIG. 12

| ... | Subtype = Beacon
Beacon | Transmitter
address
TA = Broadcast
address | Information element
identifier IE
ID = Change identifier
Change ID | CID message
mode =
Indicator bit
Indication | NULL | ... | FCS |
|---|---|---|---|---|---|---|---|

FIG. 13

METHOD FOR ALLOCATING ADDRESSING IDENTIFIER, ACCESS POINT, STATION, AND COMMUNICATIONS SYSTEM

CROSS-REFERENCE TO RELATED APPLICATIONS

This application is a continuation of International Application No. PCT/CN2015/075002, filed on Mar. 25, 2015, which claims priority to Chinese Patent Application No. 201410114893.2, filed on Mar. 25, 2014. The disclosures of the aforementioned applications are hereby incorporated by reference in their entireties.

TECHNICAL FIELD

The present invention relates to the communications field, and in particular, to a method for allocating an addressing identifier, an access point, a station, and a communications system.

BACKGROUND

A wireless local area network (wireless local area network, WLAN) can provide a wireless data transmission service in a limited range for a terminal on the wireless local area network. In a WLAN (also referred to as Wi-Fi, Wireless Fidelity, Wireless Fidelity) based on IEEE 802.11, a terminal device therein can also be connected to the Internet (Internet) by using a device such as a gateway. Because of advantages such as rapid deployment, convenient use, and high transmission rate, Wi-Fi has been widely used in various industries.

It is stipulated in the IEEE 802.11 standard that in a WLAN, addressing is performed based on a Media Access Control (Media Access Control, MAC) address. Generally, an eavesdropper may obtain MAC addresses of transmitting and receiving parties of a wireless message by receiving and analyzing the message on an air interface. By means of tracing a MAC address of a terminal, privacy information of a user of the terminal, such as a place or a time at which the user frequently appears, may be obtained, and by means of analyzing a large amount of data, privacy information of the user of the terminal, such as living habits, interests and hobbies, and even social relations, may be learned.

To ensure security of user privacy, currently, there is a solution for allocating an addressing identifier to a station; however, this is not enough to completely resolve a problem of tracing user privacy by using a MAC address. For example, within a period of time, an access point (Access Point, AP) allocates a temporary MAC address to a terminal in a basic service set served by the access point. If an eavesdropper acquires MAC addresses of all terminals in the basic service set, when the eavesdropper finds that a MAC address no longer appears while another MAC address that is new appears, the eavesdropper can determine that the new MAC address is a modified MAC address of the original terminal, and therefore, continues to trace the terminal.

SUMMARY

Embodiments of the present invention provide a method for allocating an addressing identifier, an access point, and a station, so as to prevent an eavesdropper from tracing, by using a MAC address, a terminal to acquire user privacy, ensuring security of the user privacy.

According to a first aspect, the present invention provides a method for allocating an addressing identifier, where the addressing identifier includes a Media Access Control MAC address, and the method includes: notifying, by an access point, at least two stations in a basic service set BSS served by the access point of an encrypted new MAC address that corresponds to each station, and indicating a predetermined update condition, so that the at least two stations update respective MAC addresses to the respective new MAC addresses when the predetermined update condition is met; and when the predetermined update condition is met, updating, by the access point, the MAC addresses of the at least two stations to the new MAC addresses that correspond to the stations, so that when a message is subsequently received from the stations or sent to the stations, the new MAC addresses are used as the MAC addresses of the stations.

With reference to the first aspect, in a first possible implementation manner of the first aspect: the addressing identifier further includes an association identifier AID; and when notifying the at least two stations in the basic service set BSS served by the access point of the encrypted new MAC address that corresponds to each station, the access point further notifies the stations of corresponding encrypted new AIDs; and when the predetermined update condition is met, the access point updates the MAC addresses of the at least two stations to the new MAC addresses that correspond to the stations, and updates AIDs of the at least two stations to the new AIDs that correspond to the stations.

With reference to the first possible implementation manner of the first aspect, in a second possible implementation manner of the first aspect: before the step of notifying, by the access point, the at least two stations in the basic service set BSS served by the access point of the encrypted new MAC address and new AID that correspond to each station, the method further includes: determining, by the access point, the respective new MAC addresses and new AIDs that correspond to the at least two stations in the basic service set BSS served by the access point, where the stations correspond to different new MAC addresses and different new AIDs.

With reference to the second possible implementation manner of the first aspect, in a third possible implementation manner of the first aspect: the step of determining, by the access point, the respective new MAC addresses and new AIDs that correspond to the at least two stations in the basic service set BSS served by the access point includes: receiving, by the access point, update requests of the at least two stations in the BSS served by the access point, where an update request of each station includes a new MAC address requested by each station; and performing, by the access point, a uniqueness check on the new MAC address requested by each station, and when the uniqueness check succeeds, allocating the new AID to each station, where the new MAC address requested by each station and the allocated AID are the determined new MAC address and new AID of the station; and the step of notifying the at least two stations of the encrypted new MAC address and new AID that correspond to each station includes: returning, by the access point, a confirmation message to each station in a unicast manner, where the confirmation message indicates that the station is allowed to use the requested new MAC address, and notifying each station of the new AID, where the new AID is carried in the confirmation message or is sent by using another message that is sent from the access point.

With reference to the second possible implementation manner of the first aspect, in a fourth possible implementation manner of the first aspect: the step of determining, by the access point, the respective new MAC addresses and new AIDs that correspond to the at least two stations in the basic service set BSS served by the access point includes: allocating, by the access point, the new MAC addresses and the new AIDs to the at least two stations in the BSS served by the access point, where the new MAC address and the new AID that are allocated to each station are the determined new MAC address and new AID that correspond to the station; and the step of notifying the at least two stations of the encrypted new MAC address and new AID that correspond to each station includes: sending, to the at least two stations in a unicast manner, the respective encrypted new MAC addresses and new AIDs that correspond to the stations.

With reference to the first aspect or any one of the first to the fourth possible implementation manners of the first aspect, in a fifth possible implementation manner of the first aspect: the indicating a predetermined update condition includes: when notifying the at least two stations in the basic service set BSS served by the access point of the encrypted new MAC address that corresponds to each station, adding, by the access point, a predetermined duration or a predetermined time point indicating when an update is to be performed; or after notifying the at least two stations in the basic service set BSS served by the access point of the encrypted new MAC address that corresponds to each station, separately sending, by the access point, an update indication message to the at least two stations in a unicast manner; or after the access point notifies the at least two stations in the basic service set BSS served by the access point of the encrypted new MAC address that corresponds to each station, group-sending, by the access point, an update indication message to the at least two stations in a broadcast manner.

With reference to the fifth possible implementation manner of the first aspect, in a sixth possible implementation manner of the first aspect: the step of group-sending the update indication message to the at least two stations in a broadcast manner includes: group-sending the update indication message to the at least two stations by broadcasting a beacon frame to which an indicator bit is added, where the indicator bit includes update indication information used to instruct the at least two stations to update an addressing identifier.

With reference to the first aspect, in a seventh possible implementation manner of the first aspect: before the step of notifying, by an access point, at least two stations in a basic service set BSS served by the access point of an encrypted new MAC address and new AID that correspond to each station, the method further includes: performing, by the access point, encryption key negotiation with the at least two stations for an encryption key, and acquiring, by the access point, an encryption key used to encrypt the new MAC address of each station, where the encryption key is a symmetric encryption key or an asymmetric encryption key.

According to a second aspect, an embodiment of the present invention provides a method for allocating an addressing identifier, where the addressing identifier includes a Media Access Control MAC address, and the method for allocating an addressing identifier includes: receiving, by a station, an encrypted new MAC address that corresponds to the station and that is notified by an access point in a basic service set BSS in which the station is located, obtaining the new MAC address by means of decryption, acquiring a predetermined update condition, and when the predetermined update condition is met, updating, by the station, a currently used MAC address to the new MAC address, so that when a message is subsequently received from the access point or sent to the access point, the new MAC address is used as the MAC address of the station.

With reference to the second aspect, in a first possible implementation manner of the second aspect: the addressing identifier further includes an association identifier AID, and when receiving the encrypted new MAC address that corresponds to the station, the station also receives an encrypted new AID that corresponds to the station; and when the predetermined update condition is met, the station updates the currently used MAC address to the new MAC address, and updates a currently used AID to the new AID.

With reference to the first possible implementation manner of the second aspect, in a second possible implementation manner of the second aspect: the step of receiving, by the station, the encrypted new MAC address and new AID that correspond to the station includes: receiving, by the station, the encrypted new MAC address and new AID that are correspondingly allocated by the access point to the station.

With reference to the first possible implementation manner of the second aspect, in a third possible implementation manner of the second aspect: the step of receiving, by the station, the encrypted new MAC address and new AID that correspond to the station includes: sending, by the station, an update request to the access point, where the update request of the station includes a new MAC address requested by the station, receiving, by the station, the encrypted new MAC address that corresponds to the station from a confirmation message that is used by the access point to respond to the update request, and further receiving the encrypted new AID from the confirmation message that is used by the access point to respond to the update request or from another message sent by the access point.

With reference to the second aspect, in a fourth possible implementation manner of the second aspect: before the step of receiving, by a station, an encrypted new MAC address that corresponds to the station, the method further includes: performing, by the station, encryption key negotiation with the access point, so that the station obtains the new MAC address by means of decryption by using a corresponding decryption method according to a type of a negotiated encryption key, where the encryption key is a symmetric encryption key or an asymmetric encryption key.

According to a third aspect, an embodiment of the present invention provides an access point, where the access point includes a notification module and an update module, where: the notification module is configured to notify at least two stations in a basic service set BSS served by the access point of an encrypted new Media Access Control MAC address that corresponds to each station, and indicate a predetermined update condition, so that the at least two stations update respective MAC addresses to the respective new MAC addresses when the predetermined update condition is met; and the update module is configured to: when the predetermined update condition is met, update the MAC addresses of the at least two stations to the new MAC addresses that correspond to the stations, so that when a message is subsequently received from the stations or sent to the stations, the new MAC addresses are used as the MAC addresses of the stations.

With reference to the third aspect, in a first possible implementation manner of the third aspect: when notifying the at least two stations in the basic service set BSS served by the access point of the encrypted new MAC address that corresponds to each station, the notification module further notifies the at least two stations of an encrypted new association identifier AID that corresponds to each station; and when the predetermined update condition is met, the update module updates the MAC addresses of the at least two stations to the new MAC addresses that correspond to the stations, and updates AIDs of the at least two stations to the new AIDs that correspond to the stations.

With reference to the first possible implementation manner of the third aspect, in a second possible implementation manner of the third aspect: the access point further includes a determining module, where: the determining module is specifically configured to determine the respective new MAC addresses and new AIDs that correspond to the at least two stations in the basic service set BSS served by the access point, where the stations correspond to different new MAC addresses and different new AIDs.

With reference to the second possible implementation manner of the third aspect, in a third possible implementation manner of the third aspect: the determining module is specifically configured to receive update requests of the at least two stations in the BSS served by the access point, where an update request of each station includes a new MAC address requested by each station, perform a uniqueness check on the new MAC address requested by each station, and when the uniqueness check succeeds, allocate the new AID to each station, where the new MAC address requested by each station and the allocated new AID are the determined new MAC address and new AID of the station; and the notification module specifically returns a confirmation message to each station in a unicast manner, where the confirmation message indicates that the station is allowed to use the requested new MAC address; and notifies each station of the new AID, where the new AID is carried in the confirmation message or is sent by using another message.

With reference to the second possible implementation manner of the third aspect, in a fourth possible implementation manner of the third aspect: the determining module is specifically configured to allocate the new MAC addresses and the new AIDs to the at least two stations in the BSS served by the access point, where the new MAC address and the new AID that are allocated to each station are the determined new MAC address and new AID that correspond to the station; and the notification module specifically sends, to the at least two stations in a unicast manner, the respective encrypted new MAC addresses and new AIDs that correspond to the stations.

With reference to the third aspect or any one of the first to the fourth possible implementation manners of the third aspect, in a fifth possible implementation manner of the third aspect: the notification module specifically indicates the predetermined update condition in one of the following manners: when notifying the at least two stations in the basic service set BSS served by the access point of the encrypted new MAC address that corresponds to each station, the notification module adds a predetermined duration or a predetermined time point indicating when an update is to be performed; or after notifying the at least two stations in the basic service set BSS served by the access point of the encrypted new MAC address that corresponds to each station, the notification module separately sends an update indication message to the at least two stations in a unicast manner; or after notifying the at least two stations in the basic service set BSS served by the access point of the encrypted new MAC address that corresponds to each station, the notification module group-sends an update indication message to the at least two stations in a broadcast manner.

With reference to the fifth possible implementation manner of the third aspect, in a sixth possible implementation manner of the third aspect: the notification module specifically group-sends the update indication message to the at least two stations by broadcasting a beacon frame to which an indicator bit is added, where the indicator bit includes update indication information used to instruct the at least two stations to update an addressing identifier.

With reference to the third aspect, in a seventh possible implementation manner of the third aspect: the access point further includes a key acquiring module, where: the key acquiring module is configured to perform encryption key negotiation with the at least two stations, and acquire an encryption key used to encrypt the new MAC address of each station, where the encryption key is a symmetric encryption key or an asymmetric encryption key.

According to a fourth aspect, an embodiment of the present invention provides a station, where the station includes an obtaining module and an update module, where: the obtaining module is configured to receive an encrypted new Media Access Control MAC address that corresponds to the station and that is notified by an access point in a basic service set BSS in which the station is located, obtain the new MAC address by means of decryption, and acquire a predetermined update condition, where the stations correspond to different new MAC addresses; and the update module is configured to: when the predetermined update condition is met, update a MAC address that is currently used by the station to the new MAC address that corresponds to the station, so that when a message is subsequently received from the access point or sent to the access point, the new MAC address is used as the MAC address of the station.

With reference to the fourth aspect, in a first possible implementation manner of the fourth aspect: when receiving the encrypted new MAC address that corresponds to the station, the obtaining module further receives an encrypted new association identifier AID that corresponds to the station, and obtains the new MAC address and the new AID by means of decryption; and when the predetermined update condition is met, the update module updates the MAC address and an AID that are currently used by the station to the new MAC address and the new AID that correspond to the station.

With reference to the first possible implementation manner of the fourth aspect, in a second possible implementation manner of the fourth aspect: the obtaining module specifically obtains the new MAC address and the new AID by means of decryption by receiving the encrypted new MAC address and new AID that are correspondingly allocated by the access point to the station.

With reference to the first possible implementation manner of the fourth aspect, in a third possible implementation manner of the fourth aspect: the obtaining module specifically sends an update request to the access point, where the update request of the station includes a new MAC address requested by the station, receives the encrypted new MAC address that corresponds to the station from a confirmation message that is used by the access point to respond to the update request, and further receives the encrypted new AID from the confirmation message that is used by the access point to respond to the update request or from another message sent by the access point.

With reference to the fourth aspect, in a fourth possible implementation manner of the fourth aspect: the station further includes a key negotiation module, where: the key negotiation module is configured to perform encryption key negotiation with the access point; and the obtaining module obtains the new MAC address by means of decryption by using a corresponding decryption method according to a type of an encryption key negotiated by the key negotiation module, where the encryption key is a symmetric encryption key or an asymmetric encryption key.

According to a fifth aspect, an embodiment of the present invention provides a communications system, where the communications system includes the access point according to the third aspect or any possible implementation manner of the third aspect and the station according to the fourth aspect or any possible implementation manner of the fourth aspect.

The present invention has the following beneficial effects: Different from the prior art, in the present invention, an access point is used to adjust updates of MAC addresses of multiple stations in an entire basic service set, and notify the multiple stations of an encrypted new MAC address that corresponds to each station, so that when a predetermined update condition is met, each station updates a respective MAC address to the new MAC address that corresponds to the station, and when the predetermined update condition is met, the access point also updates the MAC addresses of the multiple stations to the new MAC addresses that correspond to the stations. In such a manner, a new MAC address sent by an access point to a station is encrypted, and an eavesdropper cannot steal the new MAC address. By means of controlling multiple stations to update MAC addresses, after the MAC addresses are updated, the eavesdropper cannot continue to trace a MAC address of a terminal to acquire user privacy, ensuring security of the user privacy.

BRIEF DESCRIPTION OF THE DRAWINGS

FIG. 5 is a schematic diagram of an action frame used by an access point to send an allocated new MAC address and new AID to a station according to an embodiment of the present invention;

FIG. 6 is a schematic diagram of an action frame used by a station to return a confirmation message to an access point according to an embodiment of the present invention;

FIG. 7 shows another action frame used by an access point to send an allocated new MAC address and new AID to a station according to an embodiment of the present invention;

FIG. 8 is a schematic diagram of an action frame used by an access point to send an identifier update message to stations in a broadcast manner according to an embodiment of the present invention;

FIG. 11 is a schematic diagram of a format of a frame used by a station 1 to send a reassociation request to an access point according to an embodiment of the present invention;

FIG. 12 is a schematic diagram of a format of a frame used by an access point to send a reassociation response to a station 1 according to an embodiment of the present invention;

FIG. 13 is a schematic diagram of a beacon frame used by an access point to send update indication information to a station according to an embodiment of the present invention;

DETAILED DESCRIPTION

Figures 1, 2:
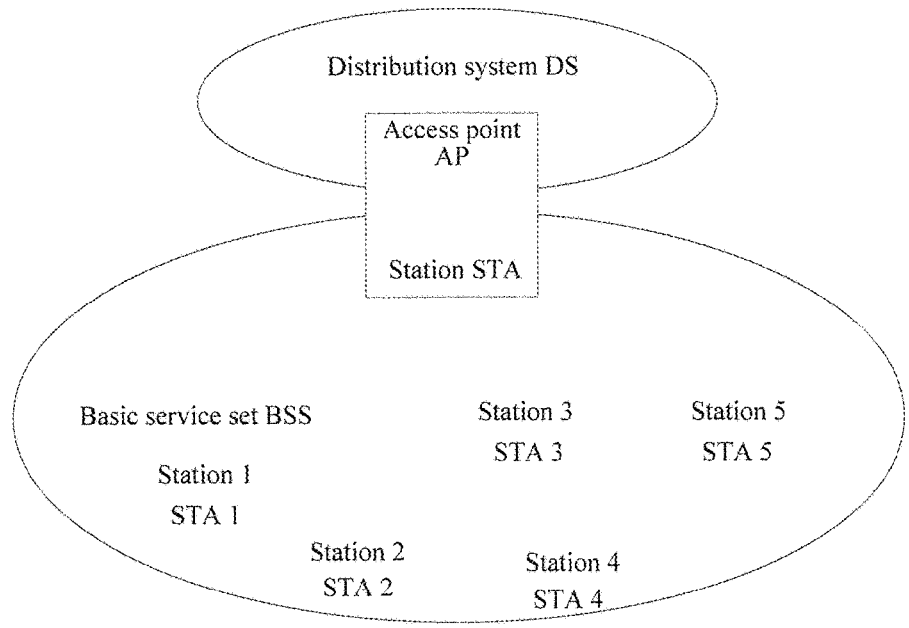
FIG. 1 is a schematic diagram of a communications system according to an embodiment of the present invention.
FIG. 2 is a flowchart of a first method for allocating an addressing identifier according to an embodiment of the present invention.

Referring to FIG. 1, FIG. 1 is a schematic diagram of a communications system according to an embodiment of the present invention. The communications system includes an access point AP and a station in a basic service set (Basic Service Set, BSS) within service coverage of the AP.

The IEEE 802.11 standard stipulates protocols of physical layer and MAC layer for wireless transmission on a spectrum of 2.4 GHz, 5 GHz, or even 60 GHz. In a basic service set BSS stipulated in the IEEE 802.11 standard, an AP is a station that functions as a control entity in the BSS, and provides, for another station associated with the AP, a connection to a distribution system (Distribution System, DS). In addition, the AP may further coordinate data sending of stations by using a point coordination function (Point Control Function, PCF). The AP in the communications system in this embodiment is associated with five stations in total: a station 1 to a station 5.

A station mentioned in the following embodiments of the present invention refers to a user station, a user terminal, or the like.

Referring to FIG. 2, FIG. 2 is a flowchart of a first method for allocating an addressing identifier according to an embodiment of the present invention. This embodiment is described from the perspective of an access point. The method for allocating an addressing identifier in this embodiment includes:

S101: An access point notifies at least two stations in a basic service set BSS served by the access point of an encrypted new MAC address that corresponds to each station, and indicates a predetermined update condition.

In this embodiment, an addressing identifier includes a MAC address.

The access point separately notifies the at least two stations of the encrypted new MAC address that corresponds to each station, and indicates the predetermined update condition, so that the at least two stations update respective MAC addresses to the respective new MAC addresses when the predetermined update condition is met.

There may be the following possible implementation manners in which the predetermined update condition is indicated:

1) when notifying the at least two stations of the encrypted new MAC address that corresponds to each station, the access point adds a predetermined duration or a predetermined time point indicating when an update is to be performed;

2) after notifying the at least two stations of the encrypted new MAC address that corresponds to each station, the access point sends an update indication message to the at least two stations in a unicast manner; and 3) after notifying the at least two stations of the encrypted new MAC address that corresponds to each station, the access point group-sends an update indication message to the at least two stations in a broadcast manner.

In other words, the indicating the predetermined update condition may be implemented by sending the predetermined update condition in a unicast manner or in a broadcast manner, and preferably, by means of broadcasting. When sending is performed in a unicast manner, information about a time at which an update is performed may be sent and carried when the notification is performed. When sending is performed in a broadcast manner, the access point may broadcast, on a working channel, an update indication message, to instruct a station to update a MAC address.

When the stations obtain the respective corresponding new MAC addresses, and the predetermined update condition is met, the stations configure the new MAC addresses at a MAC layer. In a subsequent message exchange, the new MAC addresses of the stations are used as addressing identifiers.

S102: When the predetermined update condition is met, the access point updates MAC addresses of the at least two stations to the new MAC addresses that correspond to the stations, so that when a message is subsequently received from the stations or sent to the stations, the new MAC addresses are used as the MAC addresses of the stations.

When the predetermined update condition is met, the access point updates the MAC addresses of the at least two stations at the access point to the new MAC addresses that correspond to the stations. In this way, in a next message that is received from the stations or sent to the stations, the new MAC addresses of the stations are used as the MAC addresses of the stations.

It can be understood from the foregoing detailed descriptions of this embodiment of the present invention that, in the present invention, an access point is used to adjust updates of MAC addresses of multiple stations in an entire basic service set, and notify the multiple stations of an encrypted new MAC address that corresponds to each station, so that when a predetermined update condition is met, each station updates a respective MAC address to the new MAC address that corresponds to each station; and when the predetermined update condition is met, the access point also updates the MAC addresses of the multiple stations to the new MAC addresses that correspond to the stations. In such a manner, a new MAC address sent by an access point to a station is encrypted, and an eavesdropper cannot steal the new MAC address. By means of controlling multiple stations to update MAC addresses, after the MAC addresses are updated, the eavesdropper cannot continue to trace a MAC address of a terminal to acquire user privacy, ensuring security of the user privacy.

Figure 3:
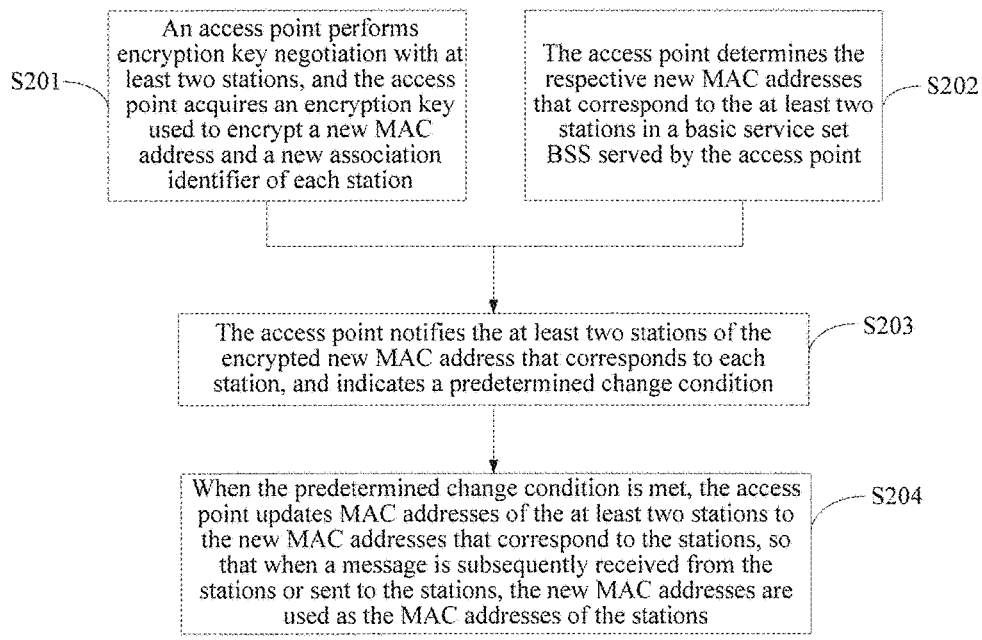
FIG. 3 is a flowchart of a second method for allocating an addressing identifier according to an embodiment of the present invention.

Referring to FIG. 3, FIG. 3 is a flowchart of a second method for allocating an addressing identifier according to an embodiment of the present invention. This embodiment is described from the perspective of an access point. The method for allocating an addressing identifier in this embodiment includes:

S201: An access point performs encryption key negotiation with at least two stations, and the access point acquires an encryption key used to encrypt a new MAC address of each station.

The access point negotiates with each station of the at least two stations about a shared encryption key, and the access point obtains an encryption key Ekey used to encrypt the new MAC address of the station. The encryption key in this embodiment of the present invention may be a symmetric encryption key or an asymmetric encryption key.

When the encryption key is a symmetric encryption key, that the access point performs encryption key negotiation with a station 1 is used as an example. When the access point negotiates with the station 1 about a shared encryption key, the access point obtains an Ekey 1, and the access point encrypts a new MAC address of the station 1 by using the Ekey 1 as an encryption key of a symmetric encryption algorithm. In an embodiment, when association identifiers (Association ID, AID) of stations also need to be updated, the encryption key is also used to encrypt new AIDs. The station 1 obtains the new MAC address and a new AID by means of decryption by using the Ekey 1. The access point and the station 1 generate a pairwise transient key (Pairwise Transient Key, PTK) by using a pairwise master key (Pairwise Master Key, PMK) in a four-step handshake phase in an authentication phase, and then generate a temporal key (Temporal Key, TK) by using the PTK.

In this embodiment, a TK that is obtained by directly intercepting 128 bits of a PTK may be used as an Ekey 1; or a key that is obtained by intercepting 128 bits from remaining bits of a PTK after a KCK (Key Confirmation Key, key confirmation key), a KEK (Key Encryption Key, key encryption key), and a TK are intercepted is used as an Ekey 1; or after the access point and the station 1 exchange random numbers (Nonce), an Ekey 1 is derived by using the random numbers of the access point and the station 1 and a TK; or after the access point and the station 1 exchange random numbers (Nonce), an Ekey 1 is derived by using the random numbers of the access point and the station 1, a timestamp (timestamp) and a TK. There are multiple derivation methods, for example, after a hash algorithm operation SHA-256 is performed by using a random number, a timestamp, and a TK, high-order 128 bits or low-order 128 bits are intercepted. Accordingly, a key negotiation process is a four-step handshake process, a random number exchange process, or the like.

When the encryption key is an asymmetric encryption key, generally a public key, that the access point performs encryption key negotiation with a station 1 is still used as an example. For example, when an RSA (Rivest Shamir Adleman) algorithm is used, an Ekey 1 is an RSA public key that is sent by the station 1 to the access point. The access point encrypts a new MAC address and a new AID of the station 1 by using the Ekey 1. After receiving the encrypted new MAC address and new AID, the station 1 performs decryption by using a corresponding RSA private key. A corresponding key negotiation process is mainly a public key sending and receiving process.

The access point encrypts a new MAC address and a new AID of a station by using an encryption key that has been negotiated with the station. The new MAC address and the new AID may be encrypted together, or may be encrypted separately. For example, a new MAC address (MAC1-1) and a new AID (AID1-1) of the station 1 are encrypted by using the Ekey 1. The Ekey 1 herein may be a symmetric encryption key or an asymmetric encryption key, and is preferably a symmetric encryption key in this embodiment of the present invention.

When the Ekey 1 is a symmetric encryption key, an encryption manner of encrypting MAC1-1 and AID1-1 may be an AES-CCM manner, the Ekey 1 is a key of 128 bits, and an encryption formula of the Ekey 1 may be expressed as follows:

encrypted MAC1-1 and AID1-1=AES-CCM-$128_{Ekey1}$ (MAC1-1 and AID1-1).

It should be noted that, MAC1-1 and AID1-1 may be separately encrypted, for example:

encrypted MAC1-1=AES-CCM-$128_{Ekey1}$ (MAC1-1) and
encrypted AID1-1=AES-CCM-$128_{Ekey1}$ (AID1-1).

In the foregoing descriptions, that the access point performs encryption key negotiation with the station 1 is used only as an example. A process in which the access point performs encryption key negotiation with another station and a process of encrypting a new MAC address and a new AID are basically the same as the foregoing descriptions, and details are not described herein again.

S202: The access point determines respective new MAC addresses that correspond to the at least two stations in a basic service set BSS served by the access point.

In an embodiment, to further prevent an eavesdropper from tracing user privacy by tracing an AID, AIDs of stations may also be updated. If AIDs of stations also need to be updated, when the access point determines the new MAC addresses of the at least two stations in the basic service set BSS served by the access point, the access point also determines a new AID that corresponds to each station.

The stations correspond to different new MAC addresses and different new AIDs.

In this embodiment, two possible implementation manners in which the access point determines respective new MAC addresses and new AIDs of the at least two stations in the BSS served by the access point are provided. Certainly, another possible manner may also be used for implementation, provided that an objective of the present invention can be achieved.

A first manner: The access point receives update requests of the at least two stations in the BSS served by the access point, where an update request of each station includes a new MAC address requested by each station. In other words, a station adds, to a request, a new MAC address that the station preferably wants to use. When the access point receives the update requests of the at least two stations, the access point performs a uniqueness check on the new MAC address requested by each station, and when the uniqueness check succeeds, allocates the new AID to each station. The new MAC address requested by each station and the allocated new AID are used as the determined new MAC address and new AID that correspond to the station.

In this embodiment of the present invention, a possible implementation manner in which the uniqueness check is performed on the new MAC address requested by the station may be: the new MAC address requested by the station is compared with MAC addresses of all stations in the basic service set BSS served by the access point, and if currently, the new MAC address requested by the station is not used by any station in the BSS served by the access point, it is considered that the uniqueness check on the new MAC address requested by the station succeeds.

A second manner: The access point allocates the new MAC addresses and the new AIDs to the at least two stations in the BSS served by the access point, where the new MAC address and the new AID that are allocated to each station are the determined new MAC address and new AID that correspond to the station.

It should be noted that in an actual application process, the foregoing step S201 and step S202 do not have a strict sequential order. In other words, S201 may be performed first and then S202 is performed, or S202 is performed first and then S201 is performed, or even S201 and S202 may be performed simultaneously.

S203: The access point notifies the at least two stations of an encrypted new MAC address that corresponds to each station, and indicates a predetermined update condition.

The access point separately notifies the at least two stations of the encrypted new MAC address that corresponds to each station, and indicates the predetermined update condition, so that the at least two stations update respective MAC addresses to the respective new MAC addresses when the predetermined update condition is met.

In an embodiment, to prevent an eavesdropper from further acquiring user privacy by tracing an AID, when a MAC address of a station is updated, an AID of the station is also updated. Therefore, in the embodiment, when notifying the at least two stations of the encrypted new MAC address that corresponds to each station, the access point may further notify each station of a corresponding encrypted new AID, so that when the predetermined update condition is met, the at least two stations update the respective MAC addresses and AIDs to the respective new MAC addresses and new AIDs.

When the access point determines, in the foregoing first manner, the respective new MAC addresses and new AIDs of the at least two stations in the BSS served by the access point, the access point returns a confirmation message to each station in a unicast manner, where the confirmation message indicates that the station is allowed to use the requested new MAC address; and notifies each station of the new AID. When the uniqueness check on the new MAC address requested by the station does not succeed, a new MAC address that meets uniqueness is carried in the returned confirmation message. The new AID may be carried in the confirmation message or is sent by using another message.

When the access point determines, in the foregoing second manner, the respective new MAC addresses and new AIDs of the at least two stations in the BSS served by the access point, the access point may send, to the at least two stations in a unicast manner, the respective encrypted new MAC addresses and new AIDs that correspond to the stations.

In an actual implementation, an information element (Information Element, IE) or a new management frame (Management Frame) may be defined to implement a message exchange related to updates of a MAC address and an AID. In addition, IEEE 802.11 defines a management frame that is referred to as an action frame (Action Frame), where a management frame required by an independent service activity is defined by defining a new action category (Action Category). This embodiment is described by using an example in which an action frame is defined, but is not limited thereto.

Figure 4:
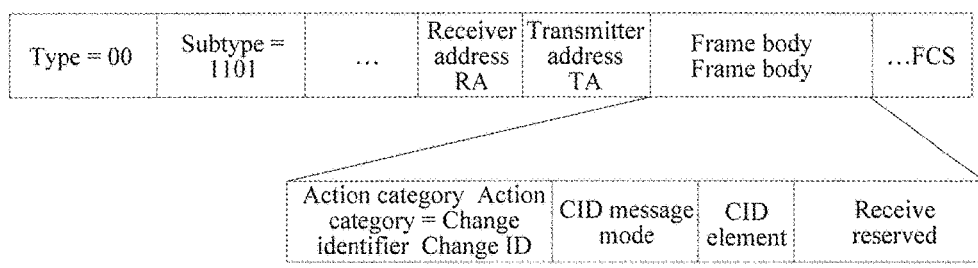
FIG. 4 is a schematic diagram of an action frame according to an embodiment of the present invention.

Referring to FIG. 4, FIG. 4 is a schematic diagram of an action frame according to this embodiment. In a frame control field in a MAC header, if in a Type field, Type Value=00, it indicates that the frame is a management frame; if in a Subtype field, Subtype Value=1101 (which may also be expressed as Subtype=action frame shown in FIG. 5), it further indicates that the frame is an action frame in the management frame. RA indicates Receiver Address, that is, a receiver address of a message; TA indicates Transmitter Address, that is, a transmitter address of a message; and an identifier of a new action category is defined in a frame body in an action frame, which indicates an operation of an ID (Identity, identity) update service, is represented as an Update ID or CID for short, with a length of one byte. A CID message mode bit indicates whether the action frame is used for identifier update arrangement indication or for identifier update confirmation, where the identifier update arrangement indication is used to indicate that the frame is sent by an access point to a station, and is used to indicate that an addressing identifier is to be updated; and the identifier update confirmation is used to indicate that the frame is sent by a station to an access point, for confirming the indication that the access point updates an addressing identifier.

Exemplarily, a correspondence of IDs of CID message modes may be shown in the following Table 1:

TABLE 1

Correspondence of IDs of CID message modes

| Name | CID message mode ID | CID element content |
|---|---|---|
| Identifier update arrangement indication | 1 | Encrypted MAC & AID, and identifier update time |
| Identifier update confirmation | 2 | Confirmation |
| . . . | . . . | . . . |

For example, as described in Table 1, when an access point sends information, such as a new MAC address and AID, to a station 1, the ID of the CID message mode is set to 1, and an encrypted MAC and AID, and information about an identifier update time are added to the CID element content. As shown in FIG. 5, RA is a current address MAC1-0 of the station 1, that is, a MAC address before the update.

After receiving a message sent by the access point, the station 1 obtains MAC1-1 and AID1-1 by means of decryption, and returns a confirmation message to the AP, indicating that MAC1-1 and AID1-1 are accepted, as shown in FIG. 6.

Moreover, when the access point sends the MAC address and the AID to the station, time information T may not be carried. For example, the access point sends MAC1-1 and AID1-1 to the station 1. A schematic diagram of an action frame thereof is shown in FIG. 7. In this case, the access point may send an update indication message to stations in a broadcast manner, so that the stations perform updates, where an action frame may also be used as the broadcast message, as shown in FIG. 8.

Alternatively, an update indication message may also be indicated to the stations by using a broadcast message such as a beacon (Beacon) frame to which an indicator bit (Indication shown in FIG. 8) is added. For example, when the indicator bit is set to 1, after receiving the beacon frame, the stations update the MAC addresses and AIDs; when the indicator bit is set to 0, after receiving the beacon frame, the stations do not update the MAC addresses and AIDs.

The foregoing descriptions are all given by using an example in which the access point interacts with the station 1, and a process in which the access point interacts with another station is basically the same, and details are not described again.

S204: When the predetermined update condition is met, the access point updates MAC addresses of the at least two stations to the new MAC addresses that correspond to the stations, so that when a message is subsequently received from the stations or sent to the stations, the new MAC addresses are used as the MAC addresses of the stations.

If the AIDs of the stations also need to be updated, when the predetermined update condition is met, the access point updates the MAC addresses and AIDs of the at least two stations to the new MAC addresses and new AIDs that correspond to the stations.

If when notifying the stations of the new MAC addresses and the new AIDs, the access point adds a predetermined duration or a predetermined time point indicating when an update is to be performed, time information received by the stations can ensure that the stations and the access point perform an update after a same time. For example, when the time information is a timing moment, a TSF (Timing Synchronization Function, timing synchronization function) time of the stations remains synchronized with a TSF time of the access point, and when timers of the stations and a timer of the access point all reach the moment, the stations configure, at a MAC layer, the new MACs and the new AIDs that are allocated by the access point, and the access point also updates the MAC addresses and the AIDs of the stations, so that when receiving a station message indicating that a transmitter address is a new MAC address, the access point can determine information about the station and shared information of the station, such as a shared data encryption key. In a subsequent message exchange, at least one of the new MAC address and the new AID of the station is used as an addressing identifier.

An AP allocates a 16-bit AID to a station in an association phase. In a power saving mode, a PS-Poll (Power Save Poll, power save poll) message sent by a terminal carries a plaintext AID; therefore, if the terminal updates only a MAC address, an eavesdropper can still find a correspondence between old and new MAC addresses of the terminal by analyzing the AID, and further relocate the terminal. Therefore, in the method for allocating an addressing identifier according to this embodiment, when a MAC address of each station is updated, an AID is also updated. On the one hand, each new MAC address and new AID that are sent by the access point to the station are encrypted, so that an eavesdropper cannot steal the new MAC address and the new AID. On the other hand, by means of controlling multiple stations to update MAC addresses and AIDs, after the updates, the eavesdropper cannot continue to trace a MAC address and an AID of a terminal to acquire user privacy, ensuring security of the user privacy.

It should be noted that, schematic diagrams of various frames in the embodiments of the present invention are only exemplary, and values of fields in each frame or meanings represented by values are only exemplary, which may be specifically determined according to the actual situation, and are not limited in the present invention, and details are not described again elsewhere.

Figure 9:
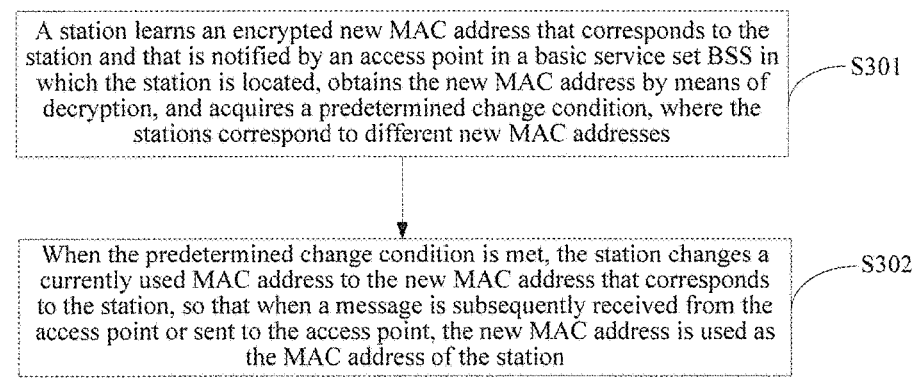
FIG. 9 is a flowchart of a third method for allocating an addressing identifier according to an embodiment of the present invention.

Referring to FIG. 9, FIG. 9 is a flowchart of a third method for allocating an addressing identifier according to an embodiment of the present invention. This embodiment is described from the perspective of a station. The method for allocating an addressing identifier in this embodiment includes the following steps:

S301: A station receives an encrypted new MAC address that corresponds to the station and that is notified by an access point in a basic service set BSS in which the station is located, obtains the new MAC address by means of decryption, and acquires a predetermined update condition, where stations correspond to different new MAC addresses.

An AP allocates a 16-bit AID to a station in an association phase. In a power saving mode, a PS-Poll (Power Saving Poll, power save poll) message sent by a terminal carries a plaintext AID; therefore, if the terminal updates only a MAC address, an eavesdropper can still find a correspondence between old and new MAC addresses of the terminal by analyzing the AID, and further relocate the terminal.

Therefore, in an embodiment, both the MAC address and the AID of the station may be updated to prevent the eavesdropper from tracing privacy information of a user by tracing the AID of the station. When notifying the station of a new MAC address, the access point also notifies the station of a new AID that corresponds to the station. Therefore, in the embodiment of the present invention, when receiving the encrypted new MAC address that corresponds to the station, the station also receives an encrypted new AID that corresponds to the station, and obtains the new MAC address and the new AID by means of decryption, where stations correspond to different new MAC addresses and different new AIDs.

Before the receiving, by the station, the encrypted new MAC address and new AID that correspond to the station, the following is further included: performing, by the station, encryption key negotiation with the access point, so that the station obtains the new MAC address and the new AID by means of decryption by using a corresponding decryption method according to a type of a negotiated encryption key. The encryption key may be a symmetric encryption key or an asymmetric encryption key. For example, when the encryption key is a symmetric encryption key, the station performs decryption by using a corresponding key; when the encryption key is an asymmetric encryption key, the station performs decryption by using a private key that corresponds to the key. For a key negotiation and encryption process, reference may be made to related parts in the foregoing embodiments, and details are not described herein again.

An implementation manner in which the station receives the encrypted new MAC address and new AID that correspond to the station is: The station receives the encrypted new MAC address and new AID that are correspondingly allocated by the access point to the station, thereby receiving the encrypted new MAC address and new AID that correspond to the station.

Another implementation manner is: The station requests the access point to update the MAC address, that is, sends an update request to the access point, where the update request of the station may include a new MAC address requested by the station. It should be noted that, the new MAC address carried in the request is also encrypted. For an encryption manner thereof, reference may be made to related parts in the foregoing embodiments, and details are not described herein again. The access point receives the update request of the station, obtains the requested new MAC address by means of decryption, performs a uniqueness check, and then sends a confirmation message for responding to the update request. The station receives, from the confirmation message that is used by the access point to respond to the update request, the encrypted new MAC address that corresponds to the station, and may further receive the new AID.

When the uniqueness check on the new MAC address requested by the station succeeds, the new MAC address that corresponds to the station is the new MAC address requested by the station; when the uniqueness check on the new MAC address requested by the station does not succeed, the new MAC address that corresponds to the station is a new MAC address that meets uniqueness and that is allocated by the access point to the station, and the new AID that corresponds to the station is also allocated by the access point to the station. The new AID may be carried in the confirmation message, or may be separately sent by using another message.

In a specific implementation, that the station sends an update request to the access point may also be implemented by defining an action frame or a new management frame or a new information element (IE). A method for defining an action frame has been described in Embodiment 2 and Embodiment 3. This embodiment is described by using an example in which a new IE is defined, but is not limited thereto. The newly defined information element may be carried in various types of management frames for sending, such as a probe request/response (Probe Request/Response), a reassociation request/response (Reassociation Request/Response), and a beacon (Beacon) frame.

Figure 10:
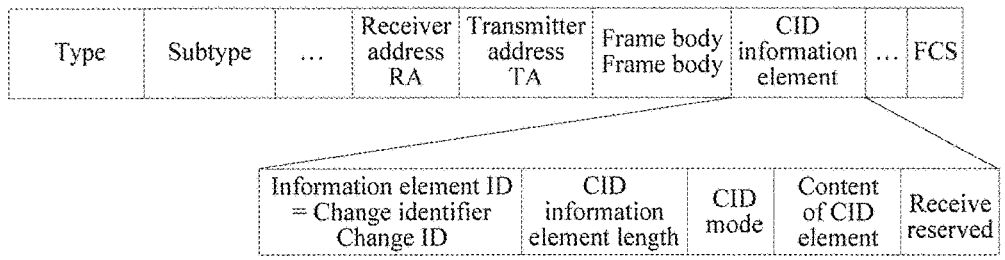
FIG. 10 is a schematic diagram of a format of an IE used by a station to send an update request to an access point according to an embodiment of the present invention.

FIG. 10 is a schematic diagram of a format of an IE used by a station to send an update request to an access point according to an embodiment of the present invention. Subtype indicates a management frame that carries the IE. For example, when the IE is carried in a reassociation request frame, Subtype value=0010; when the IE is carried in a reassociation response frame, Subtype value=0011; when the IE is carried in a beacon frame, Subtype value=1000. RA is a receiver address, and TA is a transmitter address.

A CID information element mainly includes:

an information element ID: one byte, where when a new information element is redefined for a service, a new information element ID needs to be registered, and a receiver identifies a type of the service according to the information element ID when receiving a message;

an information element length: defines a length of the information element; and a CID message mode and CID element content: carry different content according to different message modes, where for example, in a request mode (which is 1 in Table 2), a MAC address is preferably carried; in a response mode (which is 2 in Table 2), a confirmation indication and an AID are carried; in an indicator bit Indication mode (which is 4 in Table 2), NULL is carried, as shown in Table 2.

TABLE 2

Correspondence table between CID message mode and content

| Name | CID message mode ID | CID element content |
|---|---|---|
| Identifier update arrangement request | 1 | Encrypted MAC |
| Identifier update confirmation | 2 | Confirmation indication and encrypted AID |
| Identifier update indication | 4 | NULL |
| . . . | . . . | . . . |

For example, a station 1 sends a request to the access point. The station 1 determines a preferred MAC address MAC1-1, and encrypts the preferred MAC address. An encryption manner is described above. The station 1 sends a reassociation request to the access point, carrying a CID IE. A frame format of the CID IE is shown in FIG. 11.

After receiving the reassociation request, the access point obtains the CID IE in the reassociation request, and decrypts encrypted MAC1-1 in the CID IE, to obtain MAC1-1. Subsequently, the access point performs a uniqueness check on MAC1-1 in a BSS. A check manner may be comparing MAC1-1 with MAC addresses of all stations in the BSS. When MAC1-1 is not used by any STA currently, it is considered that MAC1-1 is unique in the BSS. The access point encrypts AID1-1 newly allocated to the station 1.

The access point sends a reassociation response to the station 1, carrying a CID IE. A frame format of the CID IE is shown in FIG. 12.

When the access point receives update requests of at least two stations, the access point may broadcast a message, carrying indication information. For example, the access point may broadcast a beacon (Beacon) frame. In the Beacon frame, a bit is used to instruct the stations to update an addressing identifier (which, in this embodiment, is a MAC address, or a MAC address and an AID); or the CID IE is carried in the Beacon frame, where a message format is shown in FIG. 13.

In another possible implementation manner, the confirmation message sent by the access point to the station further carries an update time T. At least two stations in a BSS in which the access point is located can support update of an addressing identifier (which, in this embodiment, refers to a MAC address, or a MAC address and an AID). When a identifier update triggering condition is met, the at least two stations send MAC address update requests to the access point within a time period t after the identifier update triggering condition is met. Therefore, after the access point receives an update request of the first station, if timing is T0, when a time T stipulated by the access point meets the following condition, that is, T>T0+t, it can be ensured that update requests of at least two stations are received before the moment T arrives.

S302: When the predetermined update condition is met, the station updates a currently used MAC address to the new MAC address that corresponds to the station, so that when a message is subsequently received from the access point or sent to the access point, the new MAC address is used as the MAC address of the station.

When the station receives the encrypted new MAC address that corresponds to the station, if the station also receives the encrypted new AID that corresponds to the station, when the predetermined update condition is met, the station updates the currently used MAC address and AID to the new MAC address and the new AID that correspond to the station.

Based on the foregoing embodiments provided, to further clearly describe the method for allocating an addressing identifier of the present invention, the following description is provided by using an example in which an access point interacts with at least two stations. In the several embodiments in the following example, a station i indicates any station other than a station 1. MAC1-1 and AID1-1 are respectively a new MAC address and a new AID of the station 1, and MAC1-0 is a MAC address of the station 1 before an update. Similarly, MACi–1 and AIDi–1 are respectively a new MAC address and a new AID of the station i, and MACi–0 is a MAC address of the station i before an update.

Figure 14:
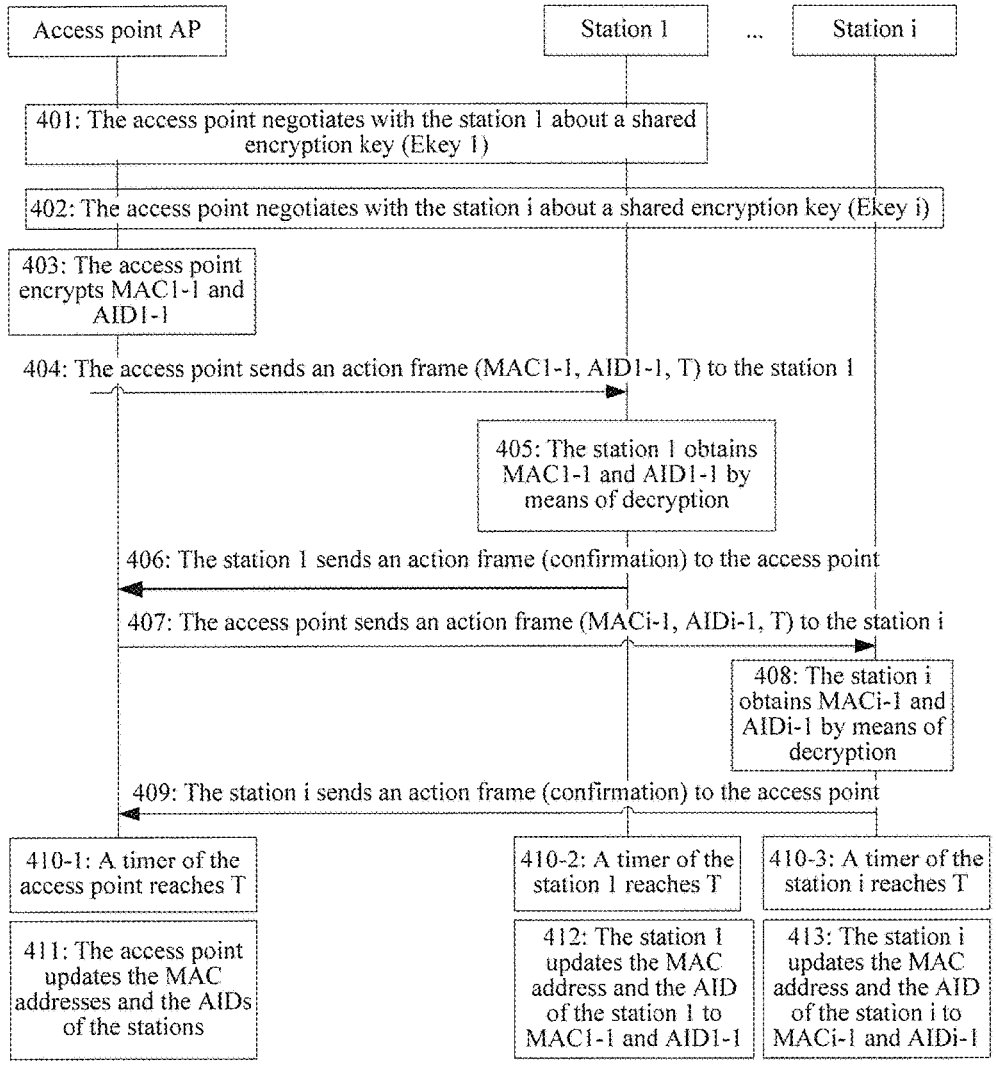
FIG. 14 is a flowchart of a fourth method for allocating an addressing identifier according to an embodiment of the present invention.

Referring to FIG. 14, FIG. 14 is a flowchart of a fourth method for allocating an addressing identifier according to an embodiment of the present invention. This embodiment is applicable to the foregoing case in which an access point proactively allocates a new MAC address and a new AID to a station. The method in this embodiment includes the following steps:

401: An access point negotiates with a station 1 about a shared encryption key (Ekey 1).

The access point negotiates with the station 1 about the shared encryption key, to determine a key Ekey 1 used to encrypt a new MAC and a new AID of the station 1.

402: The access point negotiates with a station i about a shared encryption key (Ekey i).

The access point negotiates with the station i about the shared encryption key, to determine a key Ekey i used to encrypt a new MAC and a new AID of the station i.

403: The access point encrypts MAC1-1 and AID1-1.

404: The access point sends an action frame (MAC1-1, AID1-1, T) to the station 1.

The access point sends the action frame to the station 1, where the action frame carries encrypted MAC1-1 and AID1-1, and an identifier update time T, and a corresponding receiver address is MAC1-0.

405: The station 1 obtains MAC1-1 and AID1-1 by means of decryption.

406: The station 1 sends an action frame (confirmation) to the access point.

The station 1 sends an action frame to the access point, for confirming that MAC1-1 and AID1-1 have been received, where a corresponding transmitter address is MAC1-0.

407: The access point sends an action frame (MACi–1, AIDi–1, T) to the station i.

The access point sends the action frame to the station i, where the action frame carries encrypted MACi–1 and AIDi–1, and an identifier update time T, and a corresponding receiver address is MACi–0.

408: The station i obtains MACi–1 and AIDi–1 by means of decryption.

After receiving the action frame, the station i obtains MACi–1 and AIDi–1 by means of decryption.

409: The station i sends an action frame (confirmation) to the access point.

The station i sends an action frame to the access point, for confirming that MACi–1 and AIDi–1 have been received, where a corresponding transmitter address is MACi–0.

410-1: A timer of the access point reaches T.

410-2: A timer of the station 1 reaches T.

410-3: A timer of the station i reaches T.

The foregoing step numbers 401-1 to 410-3 are only for ease of distinguishing, and in fact, the step numbers do not have a substantial sequential order.

411: The access point updates the MAC addresses and the AIDs of the stations.

412: The station 1 updates the MAC address and the AID of the station 1 to MAC1-1 and AID1-1.

413: The station i updates the MAC address and the AID of the station i to MACi–1 and AIDi–1.

After the timers of both the access point and the stations reach T, both the access point and the stations update the MAC addresses and the AIDs.

Figure 15:
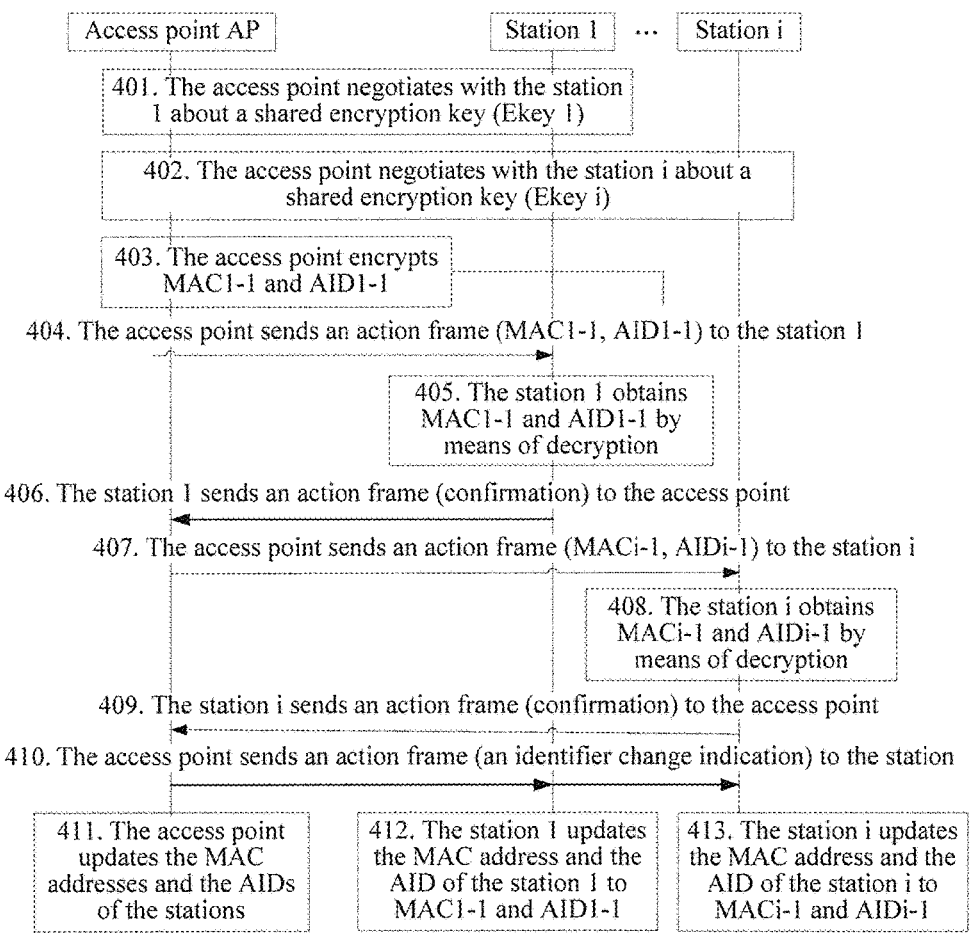
FIG. 15 is a flowchart of a fifth method for allocating an addressing identifier according to an embodiment of the present invention.

In another possible implementation manner, when the access point sends an action frame to the station, a time T indicating when an update is to be performed may not be carried. Referring to FIG. 15, FIG. 15 is a flowchart of a fifth method for allocating an addressing identifier according to an embodiment of the present invention. A difference between the embodiment shown in FIG. 15 and the embodiment shown in FIG. 14 lies in:

In step 404 and step 407, the action frame sent by the access point to the station does not carry a time T indicating when an update is to be performed, and step 410 updates to: The access point sends an action frame (identifier update indication) to the station, where a corresponding receiver address is a broadcast address. Specific implementations of the other steps are the same as those in the embodiment shown in FIG. 14, and reference may be made to the foregoing detailed descriptions.

In other words, in this embodiment, when the access point notifies the station of the new MAC and the new AID, the access point does not indicate an update time, and after sending the new MAC and the new AID, the access point broadcasts an action frame, for update indication; after receiving the indication, the station updates the MAC and the AID; the access point also updates the MACs and the AIDs of the stations after sending the indication.

Figure 16:
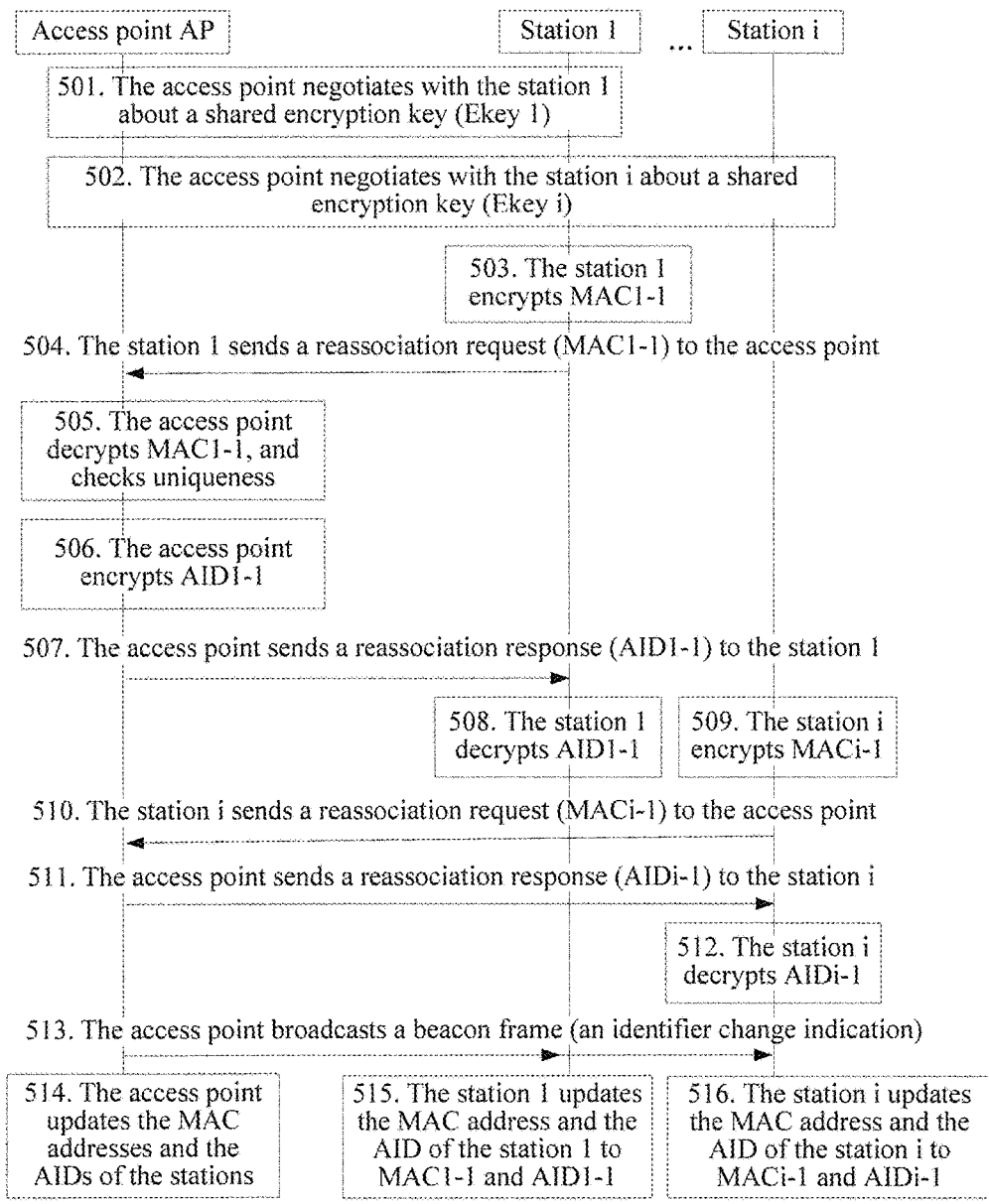
FIG. 16 is a flowchart of a sixth method for allocating an addressing identifier according to an embodiment of the present invention.

Referring to FIG. 16, FIG. 16 is a flowchart of a sixth method for allocating an addressing identifier according to an embodiment of the present invention. This embodiment is applicable to the foregoing case in which a station sends a request to an access point, so as to obtain a new MAC address and a new AID. The method in this embodiment includes the following steps:

S01: An access point negotiates with a station 1 about a shared encryption key (Ekey 1).

The access point negotiates with the station 1 about the shared encryption key, to determine a key Ekey 1 used to encrypt a new MAC and a new AID of the station 1.

502: The access point negotiates with a station i about a shared encryption key (Ekey i).

The access point negotiates with the station i about the shared encryption key, to determine a key Ekey i used to encrypt a new MAC and a new AID of the station i.

503: The station 1 encrypts MAC1-1.

The station 1 encrypts the new MAC address MAC1-1 that the station 1 preferably wants to use.

504: The station 1 sends a reassociation request (MAC1-1) to the access point.

The station 1 sends the reassociation request to the access point, where the request includes encrypted MAC1-1 that the station 1 preferably wants to use, and a corresponding transmitter address is MAC1-0.

505: The access point decrypts MAC1-1, and checks uniqueness.

The access point obtains MAC1-1 by means of decryption, and performs a uniqueness check on MAC1-1. A possible implementation manner in which the access point performs the uniqueness check on MAC1-1 may be: comparing MAC1-1 with MAC addresses of all stations in a basic service set BSS served by the access point, and if currently, the address MAC1-1 is not used by any station in the BSS served by the access point, it is considered that the uniqueness check on MAC1-1 succeeds.

506: The access point encrypts AID1-1.

After the uniqueness check on MAC1-1 succeeds, the access point allocates the new association identifier AID1-1 to the station 1, and encrypts AID1-1.

507: The access point sends a reassociation response (AID1-1) to the station 1.

The access point sends a reassociation response to the station 1, indicating that the access point allows the station 1 to use MAC1-1, and adds AID1-1 to the response, and a corresponding receiver address is MAC1-0.

508: The station 1 decrypts AID1-1.

The station 1 obtains AID1-1 by means of decryption.

509: The station i encrypts MACi-1.

The station i encrypts the new MAC address MACi-1 that the station i preferably wants to use.

510: The station i sends a reassociation request (MACi-1) to the access point.

The station i sends the reassociation request to the access point, where the request includes encrypted MACi-1 that the station i preferably wants to use, and a corresponding transmitter address is MACi-0.

511: The access point sends a reassociation response (AIDi-1) to the station i.

The access point obtains MACi-1 by means of decryption, performs a uniqueness check, and when the uniqueness check on MACi-1 succeeds, allocates a new association identifier AIDi-1 to the station i. The access point sends a reassociation response to the station i, indicating that the access point allows the station i to use MACi-1, and adds AIDi-1 to the response, and a receiver address is MACi-0.

512: The station i obtains AIDi-1 by means of decryption.

513: The access point broadcasts a beacon frame (identifier update indication).

The access point broadcasts the beacon frame to the stations, instructing the stations to update the MAC addresses and the AIDs.

514: The access point updates the MAC addresses and the AIDs of the stations.

515: The station 1 updates the MAC address and the AID of the station 1 to MAC1-1 and AID1-1.

516: The station i updates the MAC address and the AID of the station i to MACi-1 and AIDi-1.

When receiving the beacon frame, the stations update respective MAC addresses and AIDs. After broadcasting the beacon frame, the access point also updates the MAC addresses and the AIDs of the stations.

Figure 17:
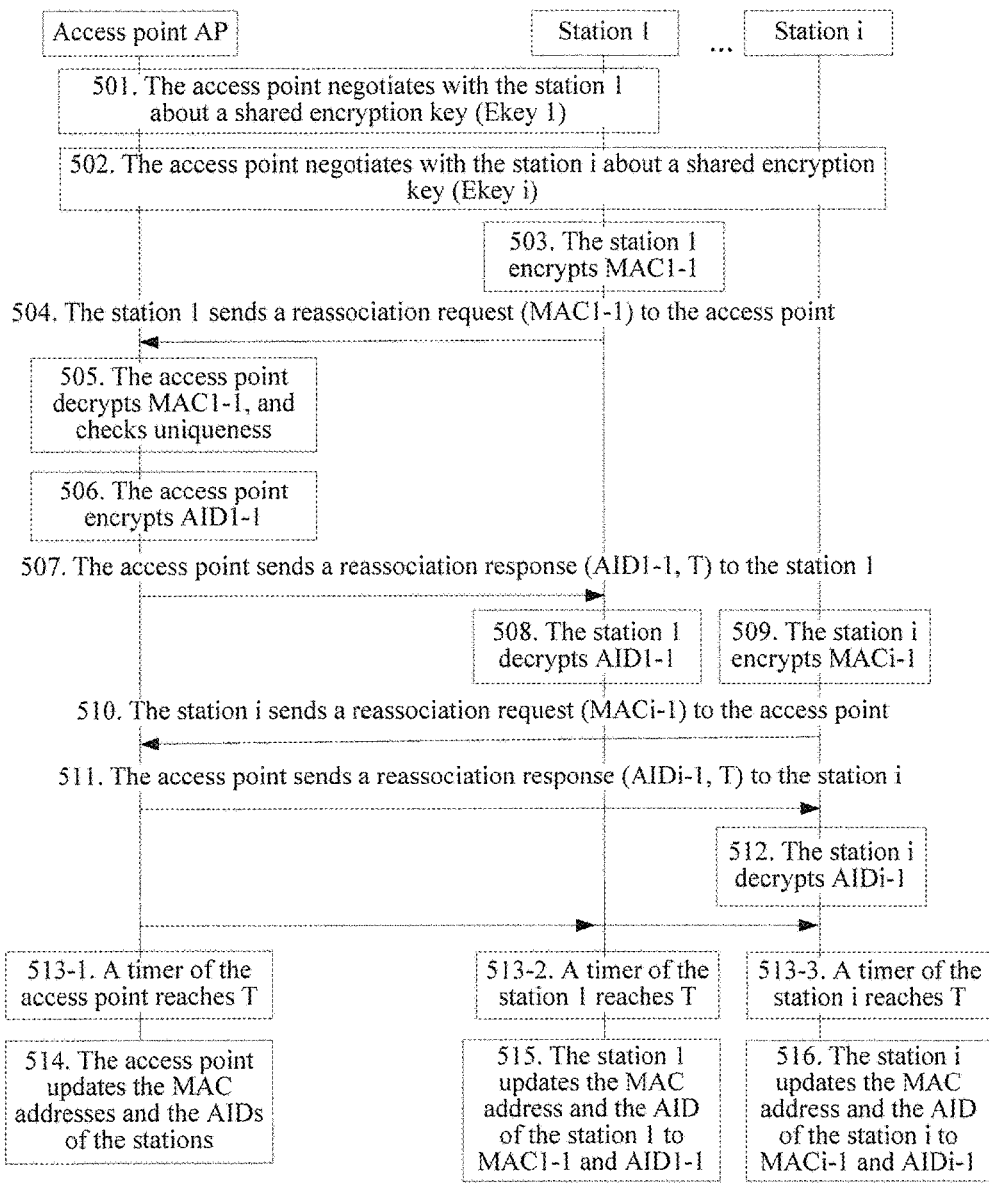
FIG. 17 is a flowchart of a seventh method for allocating an addressing identifier according to an embodiment of the present invention.

In another possible implementation manner, when the access point sends a reassociation response to the station, a time T indicating when an update is to be performed may be carried. Referring to FIG. 17, FIG. 17 is a flowchart of a seventh method for allocating an addressing identifier according to an embodiment of the present invention. A difference between the embodiment shown in FIG. 17 and the embodiment shown in FIG. 16 lies in:

In step 507 and step 511, the reassociation response sent by the access point to the station carries the time T indicating when an update is to be performed.

Accordingly, step 513 updates to:

513-1: A timer of the access point reaches T.

513-2: A timer of the station 1 reaches T.

513-3: A timer of the station i reaches T.

Specific implementations of the other steps are the same as those in the embodiment shown in FIG. 16, and reference may be made to the foregoing detailed descriptions.

In other words, in this embodiment, when sending the reassociation response to the station, the access point indicates the update time T, and both the access point and the stations update the MAC addresses and the AIDs after timing reaches T.

It should be noted that, the embodiments shown in FIG. 14 to FIG. 17 only show a specific example of the embodiments of the present invention. In the descriptions, numbers of the steps are only for ease of distinguishing, which in fact, are not used to limit a sequential order of the steps. For example, in an actual operation process, that the access point negotiates with the station 1 about a shared key and that the access point negotiates with the station i about a shared key, or that the station 1 sends a reassociation request to the access point and that the station i sends a reassociation request to the access point, or the like, may not have a strict sequential order, and may even be performed simultaneously. A person skilled in the art should understand that the numbers of the foregoing steps do not mean that the steps are performed in a sequential order in a real sense.

Figure 18:
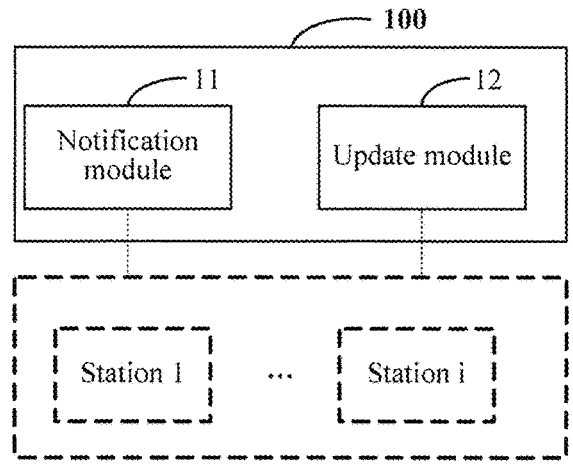
FIG. 18 is a schematic structural diagram of a first access point according to an embodiment of the present invention.

Referring to FIG. 18, FIG. 18 is a schematic structural diagram of a first access point according to an embodiment of the present invention. The access point 100 in this embodiment includes a notification module 11 and an update module 12.

The notification module 11 is configured to notify at least two stations in a basic service set BSS served by the access point of an encrypted new MAC address that corresponds to each station, and indicate a predetermined update condition, so that the at least two stations update respective MAC addresses to the respective new MAC addresses when the predetermined update condition is met.

The notification module 11 separately notifies the at least two stations of the encrypted new MAC address that corresponds to each station, and indicates the predetermined update condition, so that the at least two stations update the respective MAC addresses to the respective new MAC addresses when the predetermined update condition is met.

There may be the following possible implementation manners in which the notification module 11 indicates the predetermined update condition:

1) when notifying the at least two stations of the encrypted new MAC address that corresponds to each station, adding a predetermined duration or a predetermined time point indicating when an update is to be performed;

2) after notifying the at least two stations of the encrypted new MAC address that corresponds to each station, sending an update indication message to the at least two stations in a unicast manner; and 3) after notifying the at least two stations of the encrypted new MAC address that corresponds to each station, group-sending an update indication message to the at least two stations in a broadcast manner.

In other words, the indicating, by the notification module 11, the predetermined update condition may be implemented by sending the predetermined update condition in a unicast manner or in a broadcast manner, and preferably, by means of broadcasting. When sending is performed in a unicast manner, the notification module 11 may send and carry information about a time at which an update is performed when the notification is performed. When sending is performed in a broadcast manner, the notification module 11 may broadcast, on a working channel, an update indication message, to instruct a station to update a MAC address.

When the stations obtain the respective corresponding new MAC addresses, and the predetermined update condition is met, the stations configure the new MAC addresses at a MAC layer. In a subsequent message exchange, the new MAC addresses of the stations are used as addressing identifiers.

The update module 12 is configured to: when the predetermined update condition is met, update the MAC addresses of the at least two stations to the new MAC addresses that correspond to the stations, so that when a message is subsequently received from the stations or sent to the stations, the new MAC addresses are used as the MAC addresses of the stations.

When the predetermined update condition is met, the update module 12 updates the MAC addresses of the at least two stations to the new MAC addresses that correspond to the stations. In a next message that is sent to and received from the stations, the new MAC addresses of the stations are used as the addressing identifiers.

It can be understood from the foregoing detailed descriptions of an access point according to this embodiment of the present invention that, in the present invention, an access point is used to adjust updates of MAC addresses of multiple stations in an entire basic service set, and notify the multiple stations of an encrypted new MAC address that corresponds to each station, so that when a predetermined update condition is met, each station updates a respective MAC address to the new MAC address that corresponds to each station; and when the predetermined update condition is met, the access point also updates the MAC addresses of the multiple stations to the new MAC addresses that correspond to the stations. In such a manner, each new MAC address sent by an access point to a station is encrypted, and an eavesdropper cannot steal the new MAC address. By means of controlling multiple stations to update MAC addresses, after the MAC addresses are updated, the eavesdropper cannot continue to trace a MAC address to acquire terminal user privacy, ensuring security of the user privacy.

Figure 19:
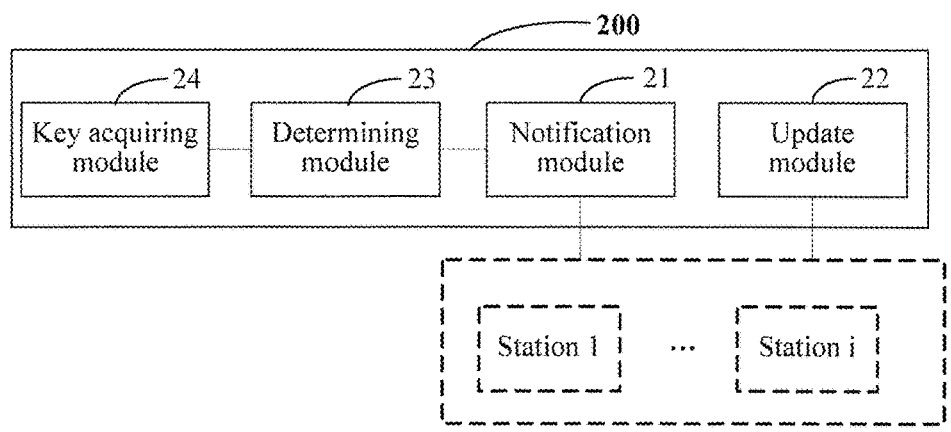
FIG. 19 is a schematic structural diagram of a second access point according to an embodiment of the present invention.

Further, referring to FIG. 19, FIG. 19 is a schematic structural diagram of a second access point according to an embodiment of the present invention. The access point 200 in this embodiment includes a notification module 21, an update module 22, a determining module 23, and a key acquiring module 24.

The notification module 21 is configured to notify at least two stations of an encrypted new MAC address that corresponds to each station, and indicate a predetermined update condition, so that the at least two stations update respective MAC addresses to the respective new MAC addresses when the predetermined update condition is met.

In an embodiment, to prevent an eavesdropper from tracing user privacy by tracing an AID, AIDs of stations may also be updated. When the AIDs of the stations also need to be updated, the notification module 21 further notifies, when notifying the at least two stations of the encrypted new MAC address that corresponds to each station, the at least two stations of an encrypted new AID that corresponds to each station.

The update module 22 is configured to: when the predetermined update condition is met, update the MAC addresses of the at least two stations to the new MAC addresses that correspond to the stations, so that when a message is subsequently received from the stations or sent to the stations, the new MAC addresses are used as the MAC addresses of the stations.

If the notification module 21 also notifies the stations of the corresponding encrypted new AIDs, when the predetermined update condition is met, the update module 22 updates the MAC addresses and the AIDs of the at least two stations to the new MAC addresses and the new AIDs that correspond to the stations, so that when a message is subsequently received from the stations or sent to the stations, at least one of the new MAC addresses and the new AIDs of the stations are used as addressing identifiers.

The determining module 23 is configured to determine the respective new MAC addresses and new AIDs that correspond to the at least two stations in a basic service set BSS served by the access point, where the stations correspond to different new MAC addresses and different new AIDs.

The determining module 23 is configured to receive update requests of the at least two stations in the BSS served by the access point, where an update request of each station includes a new MAC address requested by each station, perform a uniqueness check on the new MAC address requested by each station, and when the uniqueness check succeeds, allocate the new AID to each station, where the new MAC address requested by each station and the allocated new AID are the determined new MAC address and new AID of the station.

The notification module 21 returns a confirmation message to each station in a unicast manner, where the confirmation message indicates that the station is allowed to use the requested new MAC address; and notifies each station of the new AID.

The new AID is carried in the confirmation message or is sent by using another message.

The determining module 23 is configured to allocate the new MAC addresses and the new AIDs to the at least two stations in the BSS served by the access point, where the new MAC address and the new AID that are allocated to each station are the determined new MAC address and new AID that correspond to the station.

The notification module 21 sends, to the at least two stations in a unicast manner, the respective encrypted new MAC addresses and new AIDs that correspond to the stations.

The stations correspond to different new MAC addresses and new AIDs.

In other words, in this embodiment, two possible implementation manners in which the determining module 23 determines respective new MAC addresses and new AIDs of the at least two stations in the BSS served by the access point are provided. Certainly, another possible manner may also be used for implementation, provided that an objective of the present invention can be achieved.

A first manner: The access point receives update requests of the at least two stations in the BSS served by the access point, where an update request of each station includes a new MAC address requested by each station. In other words, a station adds, to a request, a new MAC address that the station preferably wants to use. When the access point receives the update requests of the at least two stations, the access point performs a uniqueness check on the new MAC address requested by each station, and when the uniqueness check succeeds, allocates the new AID to each station. The new MAC address requested by each station and the allocated new AID are used as the determined new MAC address and new AID that correspond to the station.

A second manner: The access point allocates the new MAC addresses and the new AIDs to the at least two stations in the BSS served by the access point, where the new MAC address and the new AID that are allocated to each station are the determined new MAC address and new AID that correspond to the station.

When the determining module 23 determines, in the foregoing first manner, the respective new MAC addresses and new AIDs of the at least two stations in the BSS served by the access point, the notification module 21 returns a confirmation message to each station in a unicast manner, where the confirmation message indicates that the station is allowed to use the requested new MAC address; and notifies each station of the new AID. When the uniqueness check on the new MAC address requested by the station does not succeed, a new MAC address that meets uniqueness is carried in the returned confirmation message. The new AID may be carried in the confirmation message or is sent by using another message.

When the determining module 23 determines, in the foregoing second manner, the respective new MAC addresses and new AIDs of the at least two stations in the BSS served by the access point, the notification module 21 sends, to the at least two stations in a unicast manner, the respective encrypted new MAC addresses and new AIDs that correspond to the stations.

In an actual implementation, an information element (Information Element, IE) or a new management frame (Management Frame) may be defined to implement a message exchange related to updates of a MAC address and an AID. In addition, IEEE 802.11 defines a management frame that is referred to as an action frame (Action Frame), where a management frame required by an independent service activity is defined by defining a new action category (Action Category). This embodiment is described by using an example in which an action frame is defined, but is not limited thereto.

The key acquiring module 24 is configured to perform encryption key negotiation with the at least two stations, and acquire an encryption key used to encrypt the new MAC address of each station, where the encryption key is a symmetric encryption key or an asymmetric encryption key.

The access point negotiates, by using the key acquiring module 24, with each station of the at least two stations about a shared encryption key, and obtains an encryption key Ekey used to encrypt the new MAC address of the station. The encryption key in this embodiment of the present invention may be a symmetric encryption key or an asymmetric encryption key.

When the encryption key is a symmetric encryption key, that the access point performs encryption key negotiation with a station 1 is used as an example. When the access point negotiates with the station 1 about a shared encryption key, the access point obtains an Ekey 1, and the access point encrypts a new MAC address of the station 1 by using the Ekey 1 as an encryption key of a symmetric encryption algorithm. In an embodiment, if AIDs of stations also need to be updated, the encryption key is also used to encrypt new AIDs. The station 1 obtains the new MAC address and a new AID by means of decryption by using the Ekey 1. The access point and the station 1 generate a pairwise transient key (Pairwise Transient Key, PTK) by using a pairwise master key (Pairwise Master Key, PMK) in a four-step handshake phase in an authentication phase, and then generate a temporal key (Temporal Key, TK) by using the PTK.

In this embodiment, a TK that is obtained by directly intercepting 128 bits of a PTK may be used as an Ekey 1; or a key that is obtained by intercepting 128 bits from remaining bits of a PTK after a KCK, a KEK, and a TK are intercepted is used as an Ekey 1; or after the access point and the station 1 exchange random numbers (Nonce), an Ekey 1 is derived by using the random numbers of the access point and the station 1 and a TK; or after the access point and the station 1 exchange random numbers (Nonce), an Ekey 1 is derived by using the random numbers of the access point and the station 1, a timestamp (timestamp) and a TK. There are multiple derivation methods, for example, after a hash algorithm operation SHA-256 is performed by using a random number, a timestamp, and a TK, high-order 128 bits or low-order 128 bits are intercepted. Accordingly, a key negotiation process is a four-step handshake process, a random number exchange process, or the like.

When the encryption key is an asymmetric encryption key, generally a public key, that the access point performs encryption key negotiation with a station 1 is still used as an example. For example, when an RSA (Rivest Shamir Adleman) algorithm is used, an Ekey 1 is an RSA public key that is sent by the station 1 to the access point. The access point encrypts a new MAC address and a new AID of the station 1 by using the Ekey 1. After receiving the encrypted new MAC address and new AID, the station 1 performs decryption by using a corresponding RSA private key. A corresponding key negotiation process is mainly a public key sending and receiving process.

The access point encrypts a new MAC address and a new AID of a station by using an encryption key that has been negotiated with the station. The new MAC address and the new AID may be encrypted together, or may be encrypted separately. For example, a new MAC address (MAC1-1) and a new association identifier (AID1-1) of the station 1 are encrypted by using the Ekey 1. The Ekey 1 herein may be a symmetric encryption key or an asymmetric encryption key, and is preferably a symmetric encryption key in this embodiment of the present invention.

When the Ekey 1 is a symmetric encryption key, an encryption manner of encrypting MAC1-1 and AID1-1 may be an AES-CCM manner, the Ekey 1 is a key of 128 bits, and an encryption formula of the Ekey 1 may be expressed as follows:

encrypted MAC1-1 and AID1-1=AES-CCM-$128_{Ekey1}$(MAC1-1 and AID1-1).

It should be noted that, MAC1-1 and AID1-1 may be separately encrypted, for example:

encrypted MAC1-1=AES-CCM-$128_{Ekey1}$(MAC1-1) and encrypted AID1-1=AES-CCM-$128_{Ekey1}$(AID1-1).

In the foregoing descriptions, that the access point performs encryption key negotiation with the station 1 is used only as an example. A process in which the access point performs encryption key negotiation with another station and a process of encrypting a new MAC address and a new AID, refer to the foregoing related parts, and details are not described herein again.

The key acquiring module 24 notifies the determining module 23 of the acquired encryption key. After encrypting the new MAC address and the new AID of the station by using the encryption key, the determining module 23 uses the notification module 21 to notify the station of the encrypted new MAC address and new AID.

When the predetermined update condition notified by the notification module 21 is met, the update module 22 updates the MAC addresses of the at least two stations in the update module 22 to the new MAC addresses that correspond to the stations, and updates the AIDs of the at least two stations to the new AIDs that correspond to the stations.

If when notifying the stations of the new MAC addresses and the new AIDs, the notification module 21 adds a predetermined duration or a predetermined time point indicating when an update is to be performed, time information received by the stations can ensure that the stations and the access point perform an update after a same time. For example, when the time information is a timing moment, a TSF time of the stations remains synchronized with a TSF time of the access point, and when timers of the stations and a timer of the access point all reach the moment, the stations configure, at a MAC layer, the new MACs and the new AIDs that are allocated by the access point, and the access point also updates the MAC addresses and the AIDs of the stations, so that when receiving a station message indicating that a transmitter address is a new MAC address, the access point can determine information about the station and shared information of the station, such as a shared data encryption key. In a subsequent message exchange, at least one of the new MAC address and the new AID of the station is used as an addressing identifier.

It should be noted that, the access point in the embodiments shown in FIG. 18 and FIG. 19 can implement the steps of the methods in the embodiments shown in FIG. 2 and FIG. 3 of the present invention. In this embodiment, a classification of the modules is only an example, and the modules in the access point may also be classified in another manner, for example, several modules are integrated into one module, as long as an objective of the present invention can be achieved.

Figure 20:
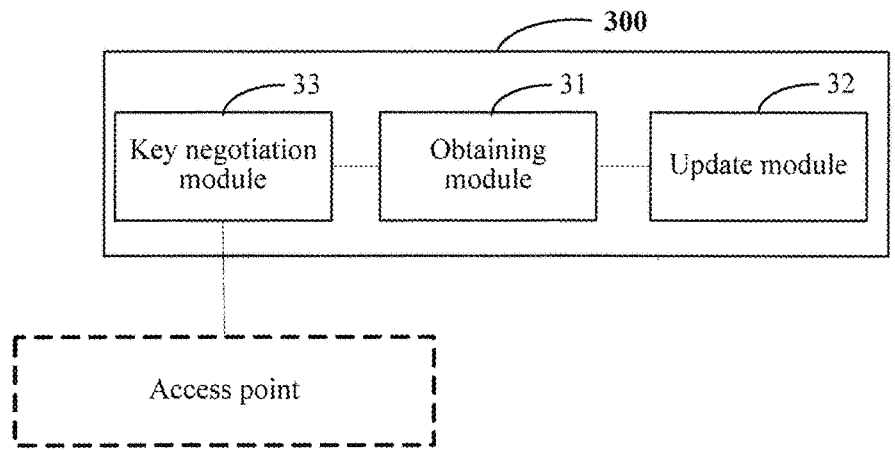
FIG. 20 is a schematic structural diagram of a first station according to an embodiment of the present invention.

Referring to FIG. 20, FIG. 20 is a schematic structural diagram of a first station according to an embodiment of the present invention. The station 300 in this embodiment includes an obtaining module 31 and an update module 32.

The obtaining module 31 is configured to receive an encrypted new MAC address that corresponds to the station, obtain the new MAC address by means of decryption, and acquire a predetermined update condition, where stations correspond to different new MAC addresses.

In an embodiment, to prevent an eavesdropper from tracing privacy information of a user by tracing an AID of a station, when notifying the station of a new MAC address, the access point also notifies the station of a new AID that corresponds to the station. Therefore, in the embodiment of the present invention, when receiving the encrypted new MAC address that corresponds to the station, the obtaining module 31 may further receive an encrypted new AID that corresponds to the station, and obtain the new MAC address and the new AID by means of decryption.

The obtaining module 31 obtains the new MAC address and the new AID by means of decryption by receiving the encrypted new MAC address and new AID that are correspondingly allocated by the access point to the station.

Alternatively, the obtaining module 31 receives, by sending an update request to the access point, the encrypted new MAC address that corresponds to the station from a confirmation message that is used by the access point to respond to the update request, where the update request of the station includes a new MAC address requested by the station, and further receives the new AID.

The obtaining module 31 receives the new AID from the confirmation message that is used by the access point to respond to the update request; or receives the new AID from another message sent by the access point.

An implementation manner in which the obtaining module 31 receives the encrypted new MAC address and new AID that correspond to the station is: The obtaining module 31 receives the encrypted new MAC address and new AID that are correspondingly allocated by the access point to the station, thereby receiving the encrypted new MAC address and new AID that correspond to the station.

Another implementation manner is: The obtaining module 31 requests the access point to update the MAC address, that is, sends an update request to the access point, where the update request includes a new MAC address requested by the station. It should be noted that, the new MAC address carried in the request is also encrypted. For a key negotiation process and an encryption process thereof, reference may be made to related parts in the foregoing embodiments, and details are not described herein again. The access point receives the request of the station, obtains the requested new MAC address by means of decryption, performs a uniqueness check, and then sends a confirmation message for responding to the request. The station receives, from the confirmation message that is used by the access point to respond to the update request, the encrypted new MAC address that corresponds to the station, and further receives the new AID.

When the uniqueness check on the new MAC address requested by the station succeeds, the new MAC address that corresponds to the station is the new MAC address requested by the station; when the uniqueness check on the new MAC address requested by the station does not succeed, the new MAC address that corresponds to the station is a new MAC address that meets uniqueness and that is allocated by the access point to the station, and the new AID that corresponds to the station is also allocated by the access point to the station. The new AID may be carried in the confirmation message, or may be separately sent by using another message.

In another possible implementation manner, the confirmation message sent by the access point to the station further carries an update time T. At least two stations in a BSS in which the access point is located can support an addressing identifier (which, in this embodiment, is a MAC address, or a MAC address and an AID). When an update triggering condition is met, the at least two stations send MAC address update requests to the access point within a time period t after the update triggering condition is met. Therefore, after the access point receives an update request of the first station, if timing is T0, when a time T stipulated by the access point meets the following condition, that is, T>T0+t, it can be ensured that update requests of at least two stations are received before the moment T arrives.

In a specific implementation, that the station sends an update request to the access point may also be implemented by defining an action frame or a new management frame or a new information element (IE). A method for defining an action frame has been described in Embodiment 2 and Embodiment 3. This embodiment is described by using an example in which a new IE is defined, but is not limited thereto. The newly defined information element may be carried in various types of management frames for sending, such as a probe request/response (Probe Request/Response), a reassociation request/response (Reassociation Request/Response), and a beacon (Beacon) frame.

The update module 32 is configured to: when the predetermined update condition is met, update the MAC addresses of the stations to the new MAC addresses that correspond to the stations, so that when a message is subsequently received from the access point or sent to the access point, the new MAC addresses are used as the MAC addresses of the stations.

When the predetermined update condition is met, the update module 32 updates MAC addresses that are currently used by the stations to the new MAC addresses that correspond to the stations.

When the obtaining module 31 obtains the new MAC addresses that correspond to the stations, if the obtaining module 31 also receives the encrypted new AIDs that correspond to the stations, when a predetermined condition is met, the update module 32 updates both the MAC addresses and the AIDs that are currently used by the stations to the new MAC addresses and the new AIDs that correspond to the stations. When a message is received next time, at least one of the new MAC address and the new AID is used as an addressing identifier.

In another station according to an embodiment of the present invention, still referring to FIG. 20, the station 300 further includes a key negotiation module 33, where:

the key negotiation module 33 is configured to perform encryption key negotiation with the access point; and the obtaining module 31 obtains the new MAC address and the new AID by means of decryption by using a corresponding decryption method according to a type of an encryption key negotiated by the key negotiation module 33, where the encryption key is a symmetric encryption key or an asymmetric encryption key.

Before the receiving, by the obtaining module 31, the encrypted new MAC address and new AID that correspond to the station, the following is further included: performing, by the key negotiation module 33, encryption key negotiation with the access point, so that the obtaining module 31 obtains the new MAC address and the new AID by means of decryption by using the corresponding decryption method according to the type of the negotiated encryption key. The encryption key may be a symmetric encryption key or an asymmetric encryption key. For example, when the encryption key is a symmetric encryption key, the station performs decryption by using a corresponding key; when the encryption key is an asymmetric encryption key, the station performs decryption by using a private key that corresponds to the key. For a key negotiation and encryption process, reference may be made to related parts in the foregoing embodiments, and details are not described herein again.

It should be noted that, the station according to the embodiment shown in FIG. 20 can implement the steps of the method embodiment shown in FIG. 9. In this embodiment, a classification of the modules of the station is only an example, which is not used to specifically limit the scope of the present invention. The functional modules of the station can also be classified in another manner, for example, several modules are integrated into one module, as long as an objective of the present invention can be achieved.

Figure 21:
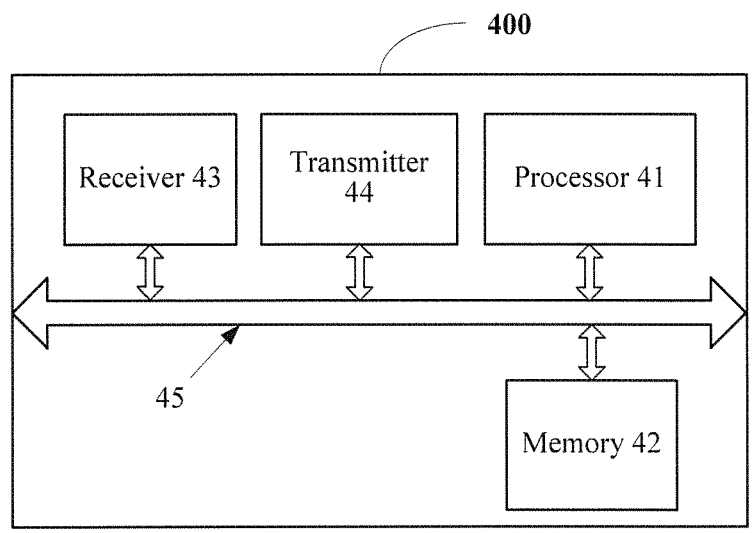
FIG. 21 is a schematic structural diagram of a third access point according to an embodiment of the present invention.

Referring to FIG. 21, FIG. 21 is a schematic structural diagram of a third access point according to an embodiment of the present invention. The access point 400 in this embodiment includes a processor 41 (where there may be one or more processors, and in the embodiments of the present invention, one processor is used as an example), a memory 42, a receiver 43, a transmitter 44, and a bus system 45.

The processor 41 controls an operation of the access point 400, and the processor 41 may also be referred to as a CPU (Central Processing Unit, central processing unit). The processor 41 may be an integrated circuit chip, and has a signal processing capability. The processor 41 may further be a general purpose processor, a digital signal processor (DSP, Digital Signal Processor), an application-specific integrated circuit (ASIC, Application Specific Integrated Circuit), a field programmable gate array (FPGA, Field Programmable Gate Array), or another programmable logic device, discrete gate or transistor logic device, or discrete hardware component. A general purpose processor may be a microprocessor, or the processor may also be any conventional processor, or the like.

The memory 42 may include a read-only memory and a random access memory, and provides an instruction and data for the processor 41. A part of the memory 42 may further include a non-volatile random access memory (NVRAM).

Components of the access point 400 are coupled together by using the bus system 45, where in addition to a data bus, the bus system 45 may further include a power bus, a control bus, a status signal bus, and the like. The bus system may be an ISA (Industry Standard Architecture, industry standard architecture) bus, a PCI (Peripheral Component Interconnect, peripheral component interconnect) bus, an EISA (Extended Industry Standard Architecture, extended industry standard architecture) bus, or the like. The bus may be one or more physical lines, and when there are multiple physical lines, the lines may be classified into an address bus, a data bus, a control bus, and the like. In some other embodiments of the present invention, the processor 41, the memory 42, the receiver 43, and the transmitter 44 may also be directly connected by using lines of communications.

However, for clear description, various buses are all marked as the bus system 45 in the figure.

The memory 42 stores the following elements, executable modules or data structures, or a subset thereof, or an extended set thereof:

operation instructions, including various operation instructions, which are used to implement various operations; and an operating system, including various system programs, which are used to implement various basic services and process a hardware-based task.

In this embodiment of the present invention, the processor 41 performs, by invoking the operation instructions stored in the memory 42 (the operation instructions may be stored in the operating system), the following operations:

notifying, by the processor 41 by using the transmitter 44, at least two stations in a basic service set BSS served by the access point of an encrypted new MAC address that corresponds to each station, and indicating a predetermined update condition, so that the at least two stations update respective MAC addresses to the respective new MAC addresses when the predetermined update condition is met.

In an embodiment, when notifying, by using the transmitter 44, the at least two stations of the encrypted new MAC address that corresponds to each station, the processor 41 may further notify the at least two stations of an encrypted new AID that corresponds to each station.

There may be the following possible implementation manners in which the processor 41 indicates the predetermined update condition by using the transmitter 44:

1) when notifying the at least two stations of the encrypted new MAC address that corresponds to each station, adding a predetermined duration or a predetermined time point indicating when an update is to be performed;

2) after notifying the at least two stations of the encrypted new MAC address that corresponds to each station, sending an update indication message to the at least two stations in a unicast manner; and 3) after notifying the at least two stations of the encrypted new MAC address that corresponds to each station, group-sending an update indication message to the at least two stations in a broadcast manner.

In other words, the indicating, by the processor 41, the predetermined update condition may be implemented by sending the predetermined update condition in a unicast manner or in a broadcast manner, and preferably, by means of broadcasting. When sending is performed in a unicast manner, the processor 41 may send and carry, by using the transmitter 44, information about a time at which an update is performed when the notification is performed. When sending is performed in a broadcast manner, the processor 41 may broadcast, on a working channel, an update indication message by using the transmitter 44, to instruct a station to update a MAC address and an AID.

When the stations obtain the respective corresponding new MAC addresses and new AIDs, and the predetermined update condition is met, the stations configure the new MAC addresses and new AIDs at a MAC layer. In a subsequent message exchange, at least one of the new MAC address and the new AID of the station is used as an addressing identifier.

Further, when the predetermined update condition is met, the processor 41 updates the MAC addresses of the at least two stations at an end of the access point to the new MAC addresses that correspond to the stations, so that when a message is subsequently received from the stations or sent to the stations, the new MAC addresses are used as the MAC addresses of the stations.

When the processor 41 notifies the stations of the new AIDs that correspond to the stations, when the predetermined update condition is met, the processor 41 updates the MAC addresses of the at least two stations to the new MAC addresses that correspond to the stations, and updates the AIDs of the at least two stations to the new AIDs that correspond to the stations. When a message is subsequently sent to the stations or received from the stations, at least one of the new MAC addresses and the new AIDs of the stations are used as addressing identifiers.

The processor 41 may further be configured to determine the respective new MAC addresses and new AIDs that correspond to the at least two stations in the basic service set BSS served by the access point, where the stations correspond to different new MAC addresses and new AIDs.

The processor 41 uses the receiver 43 to receive update requests of the at least two stations in the BSS served by the access point, where an update request of each station includes a new MAC address requested by each station, performs a uniqueness check on the new MAC address requested by each station, and when the uniqueness check succeeds, allocates the new AID to each station, where the new MAC address requested by each station and the allocated new AID are the determined new MAC address and new AID of the station.

The processor 41 returns a confirmation message to each station in a unicast manner by using the transmitter 44, where the confirmation message indicates that the station is allowed to use the requested new MAC address; and notifies each station of the new AID.

The new AID is carried in the confirmation message or is sent by using another message.

The processor 41 may further be configured to allocate the new MAC address and the new AID to the at least two stations in the BSS served by the access point, where the new MAC address and the new AID that are allocated to each station are the determined new MAC address and new AID that correspond to the station.

The processor 41 sends, to the at least two stations in a unicast manner by using the transmitter 44, the respective encrypted new MAC addresses and new AIDs that correspond to the stations.

The stations correspond to different new MAC addresses and different new AIDs.

In other words, in this embodiment, two possible implementation manners in which the processor 41 determines respective new MAC addresses and new AIDs of the at least two stations in the BSS served by the access point are provided. Certainly, another possible manner may also be used for implementation, provided that an objective of the present invention can be achieved.

A first manner: The processor 41 uses the receiver 43 to receive update requests of the at least two stations in the BSS served by the access point, where an update request of each station includes a new MAC address requested by each station. In other words, a station adds, to a request, a new MAC address that the station preferably wants to use. When the processor 41 uses the receiver 43 to receive the update requests of the at least two stations, the processor 41 performs a uniqueness check on the new MAC address requested by each station, and when the uniqueness check succeeds, allocates the new AID to each station. The new MAC address requested by each station and the allocated new AID are used as the determined new MAC address and new AID that correspond to the station.

A second manner: The processor 41 allocates the new MAC addresses and the new AIDs to the at least two stations in the BSS served by the access point, where the new MAC address and the new AID that are allocated to each station are the determined new MAC address and new AID that correspond to the station.

When the processor 41 determines, in the foregoing first manner, the respective new MAC addresses and new AIDs of the at least two stations in the BSS served by the access point, the processor 41 returns a confirmation message to each station in a unicast manner by using the transmitter 44, where the confirmation message indicates that the station is allowed to use the requested new MAC address; and notifies each station of the new AID. When the uniqueness check on the new MAC address requested by the station does not succeed, a new MAC address that meets uniqueness is carried in the returned confirmation message. The new AID may be carried in the confirmation message or is sent by using another message.

When the processor 41 determines, in the foregoing second manner, the respective new MAC addresses and new AIDs of the at least two stations in the BSS served by the access point, the processor 41 sends, to the at least two stations in a unicast manner by using the transmitter 44, the encrypted respective new MAC addresses and new AIDs that correspond to the stations.

In an actual implementation, an information element (Information Element, IE) or a new management frame (Management Frame) is defined to implement a message exchange related to updates of a MAC address and an AID. In addition, IEEE 802.11 defines a management frame that is referred to as an action frame (Action Frame), where a management frame required by an independent service activity is defined by defining a new action category (Action Category). For related descriptions of an action frame and an IE format, reference may be made to descriptions of related parts in the foregoing embodiments, and details are not described herein again.

The processor 41 is further configured to negotiate with the at least two stations for an encryption key by using the transmitter 44 and the receiver 43, and acquire an encryption key used to encrypt the new MAC address of each station, where the encryption key is a symmetric encryption key or an asymmetric encryption key.

The processor 41 negotiates with each station of the at least two stations about a shared encryption key, and obtains an encryption key Ekey used to encrypt a new MAC address and a new AID of the station. The encryption key in this embodiment of the present invention may be a symmetric encryption key or an asymmetric encryption key.

When the encryption key is a symmetric encryption key, that the processor 41 performs encryption key negotiation with a station 1 is used as an example. When the access point negotiates with the station 1 about a shared encryption key, the processor 41 obtains an Ekey 1, and the processor 41 encrypts a new MAC address of the station 1 by using the Ekey 1 as an encryption key of a symmetric encryption algorithm. In an embodiment, when AIDs also need to be updated, the encryption key is also used to encrypt the new AIDs. The station 1 obtains the new MAC address and a new AID by means of decryption by using the Ekey 1. The access point and the station 1 generate a pairwise transient key (Pairwise Transient Key, PTK) by using a pairwise master key (Pairwise Master Key, PMK) in a four-step handshake phase in an authentication phase, and then generate a temporal key (Temporal Key, TK) by using the PTK.

In this embodiment, a TK that is obtained by directly intercepting 128 bits of a PTK may be used as an Ekey 1; or a key that is obtained by intercepting 128 bits from remaining bits of a PTK after a KCK, a KEK, and a TK are intercepted is used as an Ekey 1; or after the access point and the station 1 exchange random numbers (Nonce), an Ekey 1 is derived by using the random numbers of the access point and the station 1 and a TK; or after the access point and the station 1 exchange random numbers (Nonce), an Ekey 1 is derived by using the random numbers of the access point and the station 1, a timestamp (timestamp) and a TK. There are multiple derivation methods, for example, after a hash algorithm operation SHA-256 is performed by using a random number, a timestamp, and a TK, high-order 128 bits or low-order 128 bits are intercepted. Accordingly, a key negotiation process is a four-step handshake process, a random number exchange process, or the like.

When the encryption key is an asymmetric encryption key, generally a public key. That the access point performs encryption key negotiation with a station 1 is still used as an example. For example, when an RSA (Rivest Shamir Adleman) algorithm is used, an Ekey 1 is an RSA public key that is sent by the station 1 to the access point. The access point encrypts a new MAC address and a new AID of the station 1 by using the Ekey 1. After receiving the encrypted new MAC address and new AID, the station 1 performs decryption by using a corresponding RSA private key. A corresponding key negotiation process is mainly a public key sending and receiving process.

The processor 41 encrypts a new MAC address and a new AID of a station by using an encryption key that has been negotiated with the station. The new MAC address and the new AID may be encrypted together, or may be encrypted separately. For example, a new MAC address (MAC1-1) and a new AID (AID1-1) of the station 1 are encrypted by using the Ekey 1. The Ekey 1 herein may be a symmetric encryption key or an asymmetric encryption key, and is preferably a symmetric encryption key in this embodiment of the present invention.

In the foregoing descriptions, that the access point performs encryption key negotiation with the station 1 is used only as an example. A process in which the access point performs encryption key negotiation with another station and a process of encrypting a new MAC address and a new AID are basically the same as the foregoing descriptions, and details are not described herein again.

If when notifying the stations of the new MAC addresses and the new AIDs by using the transmitter 44, the processor 41 adds a predetermined duration or a predetermined time point indicating when an update is to be performed, time information received by the stations can ensure that the stations and the access point perform an update after a same time. For example, when the time information is a timing moment, a TSF time of the stations remains synchronized with a TSF time of the access point, and when timers of the stations and a timer of the access point all reach the moment, the stations configure, at a MAC layer, the new MACs and the new AIDs that are allocated by the access point, and the access point also updates the MAC addresses and the AIDs of the stations, so that when receiving a station message indicating that a transmitter address is a new MAC address, the access point can determine information about the station and shared information of the station, such as a shared data encryption key. In a subsequent message exchange, at least one of the new MAC address and the new AID of the station is used as an addressing identifier.

The methods disclosed in the embodiments of the present invention may be applied to the processor 41, or is implemented by the processor 41. In an implementation process, steps of the foregoing methods may be performed by using an integrated logic circuit of hardware in the processor 41 or instructions in a form of software. The processor 41 may implement or perform methods, steps, and logical block diagrams disclosed in the embodiments of the present invention. Steps of the methods disclosed with reference to the embodiments of the present invention may be directly performed and completed by means of a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically-erasable programmable memory, a register, or the like. The storage medium is located in the memory 42, and the processor 41 reads information in the memory 42 and completes the steps of the foregoing methods in combination with hardware of the processor 41.

Figure 22:
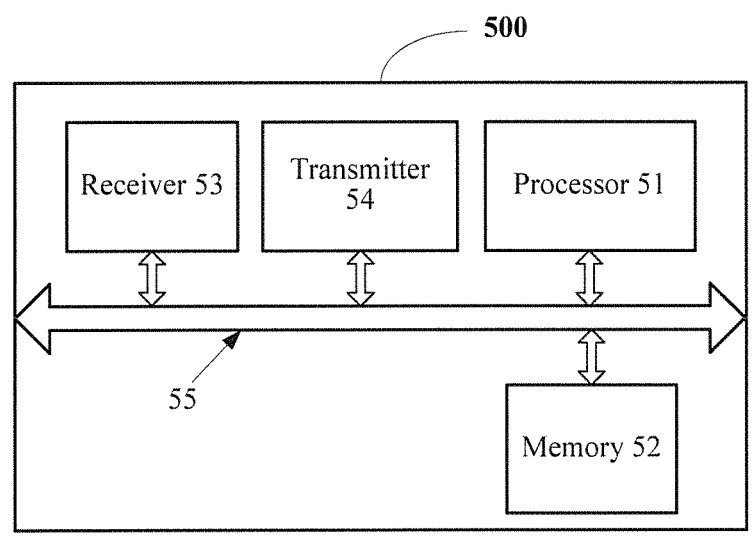
FIG. 22 is a schematic structural diagram of a second station according to an embodiment of the present invention.

Referring to FIG. 22, FIG. 22 is a schematic structural diagram of a second station according to an embodiment of the present invention. The station 500 in this embodiment includes a processor 51 (where there may be one or more processors, and in the embodiments of the present invention, one processor is used as an example), a memory 52, a receiver 53, a transmitter 54, and a bus system 55.

The processor 51 controls an operation of the station 500, and the processor 51 may also be referred to as a CPU (Central Processing Unit, central processing unit). The processor 51 may be an integrated circuit chip, and has a signal processing capability. The processor 51 may further be a general purpose processor, a digital signal processor (DSP, Digital Signal Processing), an application-specific integrated circuit (ASIC, Application Specific Integrated Circuit), a field programmable gate array (FPGA, Field Programmable Gate Array), or another programmable logic device, discrete gate or transistor logic device, or discrete hardware component. A general purpose processor may be a microprocessor, or the processor may also be any conventional processor, or the like.

The memory 52 may include a read-only memory and a random access memory, and provides an instruction and data for the processor 51. A part of the memory 52 may further include a non-volatile random access memory (NVRAM).

Components of the station 500 are coupled together by using the bus system 55, where in addition to a data bus, the bus system 55 may further include a power bus, a control bus, a status signal bus, and the like. The bus system may be an ISA (Industry Standard Architecture, industry standard architecture) bus, a PCI (Peripheral Component Interconnect, peripheral component interconnect) bus, an EISA (Extended Industry Standard Architecture, extended industry standard architecture) bus, or the like. The bus may be one or more physical lines, and when there are multiple physical lines, the lines may be classified into an address bus, a data bus, a control bus, and the like. In some other embodiments of the present invention, the processor 51, the memory 52, the receiver 53, and the transmitter 54 may also be directly connected by using lines of communications. However, for clear description, various buses are all marked as the bus system 55 in the figure.

The memory 52 stores the following elements, executable modules or data structures, or a subset thereof, or an extended set thereof:

operation instructions: including various operation instructions, which are used to implement various operations; and an operating system, including various system programs, which are used to implement various basic services and process a hardware-based task.

In this embodiment of the present invention, the processor 51 performs, by invoking the operation instructions stored in the memory 52 (the operation instructions may be stored in the operating system), the following operations:

receiving, by the processor 51, an encrypted new MAC address that corresponds to the station, obtaining the new MAC address by means of decryption, and acquiring a predetermined update condition, where stations correspond to different new MAC addresses.

In an embodiment, to prevent an eavesdropper from tracing privacy information of a user by tracing an AID of a station, when notifying the station of a new MAC address, the access point also notifies the station of a new AID that corresponds to the station. Therefore, in the embodiment of the present invention, when receiving the encrypted new MAC address that corresponds to the station, the processor 51 may further receive an encrypted new AID that corresponds to the station, and obtains the new MAC address and the new AID by means of decryption.

The processor 51 may obtain the new MAC address and the new AID by means of decryption by using the receiver 53 to receive the encrypted new MAC address and new AID that are correspondingly allocated by the access point to the station.

Alternatively, the processor 51 receives, by using the transmitter 54 to send an update request to the access point, the encrypted new MAC address that corresponds to the station from a confirmation message that is used by the access point to respond to the update request, where the update request of the station includes a new MAC address requested by the station, and further receives the new AID.

The processor 51 receives the new AID from the confirmation message that is used by the access point to respond to the update request; or receives the new AID from another message sent by the access point.

In other words, an implementation manner in which the processor 51 receives the encrypted new MAC address and new AID that correspond to the station is: The processor 51 receives the encrypted new MAC address and new AID that are correspondingly allocated by the access point to the station, thereby receiving the encrypted new MAC address and new AID that correspond to the station.

Another implementation manner is: The processor 51 requests, by using the transmitter 54, the access point to update the MAC address, that is, sends an update request to the access point, where the update request includes a new MAC address requested by the station. It should be noted that, the new MAC address carried in the request is also encrypted. For an encryption manner thereof, refer to related parts in the foregoing embodiments, and details are not described herein again. The access point receives the request of the station, obtains the requested new MAC address by means of decryption, performs a uniqueness check, and then sends a confirmation message for responding to the request. The station receives, from the confirmation message that is used by the access point to respond to the update request, the encrypted new MAC address that corresponds to the station, and further receives the new AID.

In this embodiment, a possible implementation manner in which the access point performs the uniqueness check on the new MAC address requested by the station may be: The new MAC address requested by the station is compared with MAC addresses of all stations in a basic service set BSS served by the access point, and if currently, the new MAC address requested by the station is not used by any station in the BSS served by the access point, it is considered that the uniqueness check on the new MAC address requested by the station succeeds.

When the uniqueness check on the new MAC address requested by the station succeeds, the new MAC address that corresponds to the station is the new MAC address requested by the station; when the uniqueness check on the new MAC address requested by the station does not succeed, the new MAC address that corresponds to the station is a new MAC address that meets uniqueness and that is allocated by the access point to the station, and the new AID that corresponds to the station is also allocated by the access point to the station. The new AID may be carried in the confirmation message, or may be separately sent by using another message.

In another possible implementation manner, the confirmation message sent by the access point to the station further carries an update time T. At least two stations in a BSS in which the access point is located can support an addressing identifier (which, in this embodiment, is a MAC address, or a MAC address and an AID). When an update triggering condition is met, the at least two stations send MAC address update requests to the access point within a time period t after the update triggering condition is met. Therefore, after the access point receives an update request of the first station, if timing is T0, when a time T stipulated by the access point meets the following condition, that is, T>T0+t, it can be ensured that update requests of at least two stations are received before the moment T arrives.

In a specific implementation, that the station sends an update request to the access point may also be implemented by defining an action frame or a new management frame or a new information element (IE). A method for defining an action frame has been described in Embodiment 2 and Embodiment 3. This embodiment is described by using an example in which a new IE is defined, but is not limited thereto. The newly defined information element may be carried in various types of management frames for sending, such as a probe request/response (Probe Request/Response), a reassociation request/response (Reassociation Request/Response), and a beacon (Beacon) frame. For related indication and detailed information of the IE, refer to related parts of the foregoing embodiments.

The processor 51 is further configured to: when the predetermined update condition is met, update the MAC addresses of the stations to the new MAC addresses that correspond to the stations, so that when a message is subsequently received from the access point or sent to the access point, the new MAC addresses are used as the MAC addresses of the stations.

When the processor 51 obtains the new MAC addresses that correspond to the stations, if the processor 51 also receives the encrypted new AIDs that correspond to the stations, when a predetermined condition is met, the processor 51 updates both the MAC addresses and the AIDs of the stations to the new MAC addresses and the new AIDs that correspond to the stations. When a message is received next time, at least one of the new MAC address and the new AID is used as an addressing identifier.

The processor 51 is further configured to perform encryption key negotiation with the access point, so as to obtain the new MAC address by means of decryption by using a corresponding decryption method according to a type of a negotiated encryption key, where the encryption key is a symmetric encryption key or an asymmetric encryption key.

For example, when the encryption key is a symmetric encryption key, the processor 51 performs decryption by using a corresponding key; when the encryption key is an asymmetric encryption key, the processor 51 performs decryption by using a private key that corresponds to the key. For a key negotiation and encryption process, refer to descriptions of related parts in the foregoing embodiments, and details are not described herein again.

Based on the access point and the station provided in the foregoing embodiments, an embodiment of the present invention further provides a communications system, where the communications system includes the access point according to any of the foregoing embodiments and the station according to any of the foregoing embodiments. For implementation of specific functions of the access point and the station, refer to detailed descriptions in the foregoing embodiments, and details are not described herein again.

The methods disclosed in the embodiments of the present invention may be applied to the processor 51, or is implemented by the processor 51. In an implementation process, steps of the foregoing methods may be performed by using an integrated logic circuit of hardware in the processor 51 or instructions in a form of software. The processor 51 may implement or perform methods, steps, and logical block diagrams disclosed in the embodiments of the present invention. Steps of the methods disclosed with reference to the embodiments of the present invention may be directly performed and completed by means of a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically-erasable programmable memory, a register, or the like. The storage medium is located in the memory 52, and the processor 51 reads information in the memory 52 and completes the steps of the foregoing methods in combination with hardware of the processor 51.

It can be understood from the method for allocating an addressing identifier, the access point, the station, and the communications system according to the embodiments of the present invention that, in the present invention, an access point is used to adjust updates of MAC addresses of multiple stations in an entire basic service set, and notify the multiple stations of an encrypted new MAC address and new AID that correspond to each station, so that when a predetermined update condition is met, each station updates a respective MAC address and AID to the new MAC address and the new AID that correspond to the station, and when the predetermined update condition is met, the access point also updates the MAC addresses of the multiple stations to the new MAC addresses that correspond to the stations, and updates the AIDs of the stations to the new AIDs that correspond to the stations. In such a manner, each new MAC address and new AID that are sent by an access point to a station are encrypted, and an eavesdropper cannot steal the new MAC address and the new AID. By means of controlling multiple stations to update MAC addresses and AIDs, after the updates, the eavesdropper cannot continue to trace a MAC address and an AID to acquire terminal user privacy, ensuring security of the user privacy.

In the several embodiments provided in the present invention, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely embodiments of the present invention, and the protection scope of the present invention is not limited thereto. All equivalent structure or process updates made according to the content of this specification and accompanying drawings in the present invention or by directly or indirectly applying the present invention in other related technical fields shall fall within the protection scope of the present invention.

What is claimed is:

1. A method for allocating an addressing identifier comprising a Media Access Control (MAC) address and an association identifier (AID), the method comprising:
    sending, by an access point, to at least two stations in a basic service set (BSS) served by the access point, an encrypted new MAC address and an encrypted new AID that correspond to each station, the encrypted new MAC addresses for enabling the at least two stations to update respective MAC addresses when a predetermined update condition is met, and the encrypted new AIDs for enabling the at least two stations to update respective AIDs when the predetermined update condition is met;
    sending, by the access point, an indication of the predetermined update condition; and
    when the predetermined update condition is met, updating, at the access point, the MAC addresses of the at least two stations to the new MAC addresses that correspond to the at least two stations, and updating, at the access point, the AIDs of the at least two stations to the new AIDs that correspond to the at least two stations, such that when a message is subsequently received from the stations or sent to the stations, the new MAC addresses are used as the MAC addresses of the stations.

2. The method according to claim 1, wherein before sending, by the access point, to the at least two stations in the BSS served by the access point the encrypted new MAC address and the encrypted new AID that correspond to each station, the method further comprises:
    determining, by the access point, the respective new MAC addresses and new AIDs that correspond to the at least two stations in the BSS served by the access point, wherein the stations correspond to different new MAC addresses and different new AIDs.

3. The method according to claim 2, wherein:
    determining, by the access point, the respective new MAC addresses and new AIDs that correspond to the at least two stations in the BSS served by the access point comprises:
        receiving, by the access point, update requests of the at least two stations in the BSS served by the access point, wherein an update request of each station comprises a new MAC address requested by each station, and
        performing, by the access point, a uniqueness check on the new MAC address requested by each station, and when the uniqueness check succeeds, allocating the new AID to each station, wherein the new MAC address requested by each station and the allocated AID are the determined new MAC address and new AID of the station; and
    sending to the at least two stations the encrypted new MAC address and new AID that correspond to each station comprises:
        returning, by the access point, a confirmation message to each station in a unicast manner, wherein the confirmation message indicates that the station is allowed to use the requested new MAC address, and sending to each station the new AID, wherein the new AID is carried in the confirmation message or another message that is sent from the access point.

4. The method according to claim 2, wherein:
    determining, by the access point, the respective new MAC addresses and new AIDs that correspond to the at least two stations in the BSS served by the access point comprises:
        allocating, by the access point, the new MAC addresses and the new AIDs to the at least two stations in the BSS served by the access point, wherein the new MAC address and the new AID that are allocated to each station are the determined new MAC address and new AID that correspond to the station; and
    sending to the at least two stations the encrypted new MAC address and the encrypted new AID that correspond to each station co p ses:
        sending, to the at least two stations in a unicast manner, the respective encrypted new MAC addresses and new AIDs that correspond to the stations.

5. The method according to claim 1, wherein sending the indication of the predetermined update condition comprises:
    when sending, to the at least two stations in the BSS served by the access point, the encrypted new MAC address and the encrypted new AID that correspond to each station, sending, by the access point, a predetermined duration or a predetermined time point indicating when an update is to be performed; or after sending, to the at least two stations in the BSS served by the access point, the encrypted new MAC address and the encrypted new AID that correspond to each station, separately sending, by the access point, an update indication message to the at least two stations in a unicast manner; or after sending, to the at least two stations in the BSS served by the access point, the encrypted new MAC address and the encrypted new AID that correspond to each station, group-sending, by the access point, an update indication message to the at least two stations in a broadcast manner.

6. The method according to claim 5, wherein group-sending the update indication message to the at least two stations in a broadcast manner comprises:

group-sending the update indication message to the at least two stations by broadcasting a beacon frame to which an indicator bit is added, wherein the indicator bit comprises update indication information for instructing the at least two stations to update an addressing identifier.

7. The method according to claim 1, wherein before sending, by an access point, at least two stations in a BSS served by the access point an encrypted new MAC address and an encrypted new AID that correspond to each station, the method further comprises:

performing, by the access point, encryption key negotiation with the at least two stations, and acquiring, by the access point, an encryption key for encrypting the new MAC address of each station, wherein the encryption key is a symmetric encryption key or an asymmetric encryption key.

8. A method for allocating an addressing identifier comprising a Media Access Control (MAC) address and an association identifier (AID), the method comprising:

receiving, by a station, an encrypted new MAC address and an encrypted new AID that correspond to the station and that are sent by an access point in a basic service set (BSS) in which the station is located;

obtaining a new MAC address by decrypting the encrypted new MAC address;

obtaining a new AID by decrypting the encrypted new AID; and when a predetermined update condition is met, updating, by the station, a currently used MAC address to the new MAC address and updating a currently used AID to the new AID, such that when a message is subsequently received from the access point or sent to the access point, the new MAC address is used as the MAC address of the station.

9. The method according to claim 8, wherein receiving, by the station, the encrypted new MAC address and the encrypted new AID that correspond to the station comprises:

receiving, by the station, the encrypted new MAC address and the encrypted new AID that are correspondingly allocated by the access point to the station.

10. The method according to claim 8, wherein receiving, by the station, the encrypted new MAC address and the encrypted new AID that correspond to the station comprises:

sending, by the station, an update request to the access point, wherein the update request of the station comprises a new MAC address requested by the station;

receiving, by the station, the encrypted new MAC address that corresponds to the station from a confirmation message that is used by the access point to respond to the update request; and receiving the encrypted new AID from the confirmation message that is used by the access point to respond to the update request or from another message sent by the access point.

11. The method according to claim 8, wherein before receiving, by a station, an encrypted new MAC address that corresponds to the station, the method further comprises:

performing, by the station, encryption key negotiation with the access point, so that the station obtains the new MAC address using decryption by using a corresponding decryption method according to a type of a negotiated encryption key, wherein the encryption key is a symmetric encryption key or an asymmetric encryption key.

12. An access point, comprising:

a processor; and a memory coupled to the processor and storing instructions for execution by the processor, wherein the processor is configured to execute the instructions and cause the access point to:

send, to at least two stations in a basic service set (BSS) served by the access point, an encrypted new Media Access Control (MAC) address and an encrypted new association identifier (AID) that correspond to each station, the encrypted new MAC addresses for enabling the at least two stations to update respective MAC addresses when a predetermined update condition is met, and the encrypted new AIDs for enabling the at least two stations to update respective AIDs when the predetermined update condition is met, send an indication of the predetermined update condition, and when the predetermined update condition is met, update, at the access point, the MAC addresses of the at least two stations to the new MAC addresses that correspond to the at least two stations, and update, at the access point, the AIDs of the at least two stations to the new AIDs that correspond to the at least two stations, such that when a message is subsequently received from the stations or sent to the stations, the new MAC addresses are used as the MAC addresses of the stations.

13. A station, comprising:

a processor; and a memory coupled to the processor and storing instructions for execution by the processor, wherein the processor is configured to execute the instructions and cause the station to:

receive an encrypted new Media Access Control (MAC) address and an encrypted new association identifier (AID) that correspond to the station and that are sent by an access point in a basic service set (BSS) in which the station is located, obtain a new MAC address by decrypting the encrypted new MAC address, obtain a new AID by decrypting the encrypted new AID, and when a predetermined update condition is met, update a currently used MAC address to the new MAC address and update a currently used AID to the new AID, such that when a message is subsequently received from the access point or sent to the access point, the new MAC address is used as the MAC address of the station.

14. The method according to claim 1, wherein the encrypted new MAC address and the encrypted new AID that correspond to each station are sent in a Change Identifier (CID) element in a frame body of an action frame.

15. The access point according to claim 12, wherein to send the indication of the predetermined update condition, the processor is configured to execute the instructions and cause the access point to:
   send a predetermined duration or a predetermined time point indicating when an update is to be performed; or
   separately send an update indication message to the at least two stations in a unicast manner; or
   group-send an update indication message to the at least two stations in a broadcast manner.

* * * * *